US009398250B2

(12) United States Patent
Sobti et al.

(10) Patent No.: US 9,398,250 B2
(45) Date of Patent: Jul. 19, 2016

(54) SYSTEM AND APPARATUS FOR SMART DEVICES BASED CONFERENCING

(71) Applicant: Arun Sobti & Associates, LLC, South Barrington, IL (US)

(72) Inventors: Arun Sobti, South Barrington, IL (US); Rajendra Panchal, South Barrington, IL (US); Darshana Panchal, South Barrington, IL (US)

(73) Assignee: Arun Sobti & Associates, LLC, South Barrington, IL (US)

( * ) Notice: Subject to any disclaimer, the term of this patent is extended or adjusted under 35 U.S.C. 154(b) by 0 days.

(21) Appl. No.: 14/589,442

(22) Filed: Jan. 5, 2015

(65) Prior Publication Data

US 2015/0195489 A1 Jul. 9, 2015

Related U.S. Application Data

(60) Provisional application No. 61/924,071, filed on Jan. 6, 2014, provisional application No. 61/943,831, filed on Feb. 24, 2014.

(51) Int. Cl.
*H04N 7/14* (2006.01)
*H04N 7/15* (2006.01)
*G06F 1/16* (2006.01)

(52) U.S. Cl.
CPC .............. *H04N 7/142* (2013.01); *G06F 1/1632* (2013.01); *H04N 7/15* (2013.01)

(58) Field of Classification Search
CPC ........ H04N 7/142; H04N 7/15; G06T 19/006; G06F 1/1632
USPC ........... 345/633; 348/14.08; 379/219, 428.04; 455/556.1, 557, 416, 556.2; 710/303; 713/153; 370/260; 704/246; 708/109; 709/204, 223; 725/50
See application file for complete search history.

(56) References Cited

U.S. PATENT DOCUMENTS

| | | | | | |
|---|---|---|---|---|---|
| 5,579,489 | A | * | 11/1996 | Dornier | ............... H05K 5/0273 345/173 |
| 5,822,230 | A | * | 10/1998 | Kikinis | ................. G06F 1/1616 700/38 |
| 5,835,732 | A | * | 11/1998 | Kikinis | ................. G06F 1/1626 345/173 |
| 6,434,403 | B1 | * | 8/2002 | Ausems | ............... G06F 1/1626 455/556.2 |
| 6,523,079 | B2 | * | 2/2003 | Kikinis | ................. G06F 1/1632 710/303 |

(Continued)

*Primary Examiner* — Gerald Gauthier
(74) *Attorney, Agent, or Firm* — LeClairRyan, a Professional Corporation

(57) ABSTRACT

The present disclosure relates to a multi-site, multi-location, three dimensional video conferencing system that incorporates at least one conferencing apparatus that is operatively coupled with a server (say in the cloud), wherein the conferencing apparatus enables user's own smartphones and/or tablets to be inserted/detected therein to enable conferencing to take place.

20 Claims, 35 Drawing Sheets

(56) References Cited

U.S. PATENT DOCUMENTS

| | | | | |
|---|---|---|---|---|
| 6,912,283 B2* | 6/2005 | Meyerson | H04L 12/58 348/E7.081 |
| 7,751,347 B2* | 7/2010 | Giroti | H04L 12/1822 370/260 |
| 8,438,225 B2* | 5/2013 | Serr | G06Q 10/00 709/204 |
| 8,554,897 B2* | 10/2013 | Kim | H04L 12/2812 709/223 |
| 8,718,626 B2* | 5/2014 | Rose | H04W 4/16 348/14.02 |
| 9,032,441 B2* | 5/2015 | Rance | H04N 7/173 348/14.08 |
| 9,094,805 B2* | 7/2015 | Maes | H04W 4/12 |
| 2003/0059021 A1* | 3/2003 | Meyerson | H04L 12/58 379/219 |
| 2004/0068648 A1* | 4/2004 | Lewis | H04L 12/58 713/153 |
| 2007/0004450 A1* | 1/2007 | Parikh | G06F 1/1626 455/556.1 |
| 2012/0249587 A1* | 10/2012 | Anderson | G06F 3/04895 345/633 |
| 2013/0342638 A1* | 12/2013 | Sobti | H04N 7/15 348/14.08 |
| 2013/0344917 A1* | 12/2013 | Sobti | H04M 1/0254 455/557 |
| 2014/0136203 A1* | 5/2014 | Liu | H04R 3/005 704/246 |
| 2015/0195489 A1* | 7/2015 | Sobti | H04N 7/142 348/14.08 |

* cited by examiner

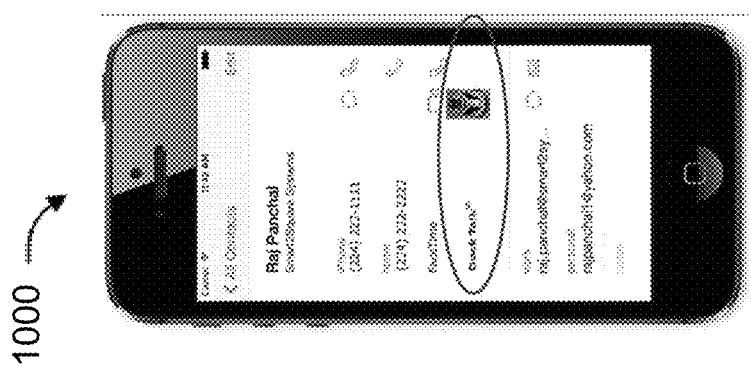
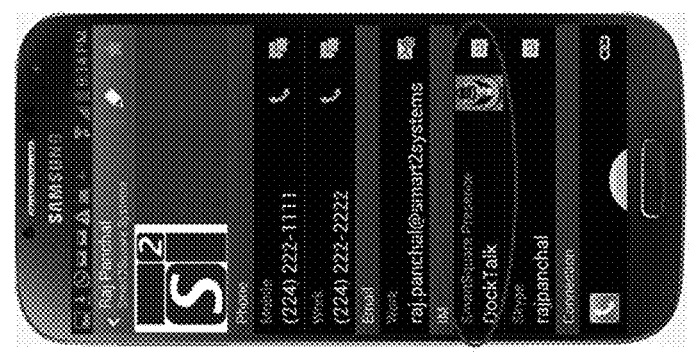
FIG. 10

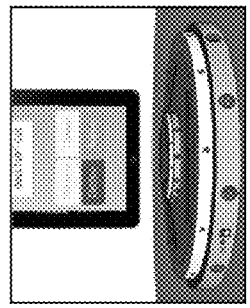
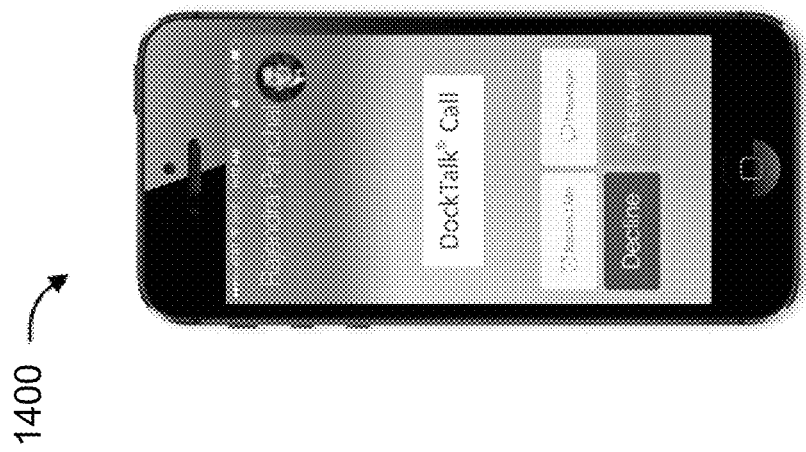
FIG. 14

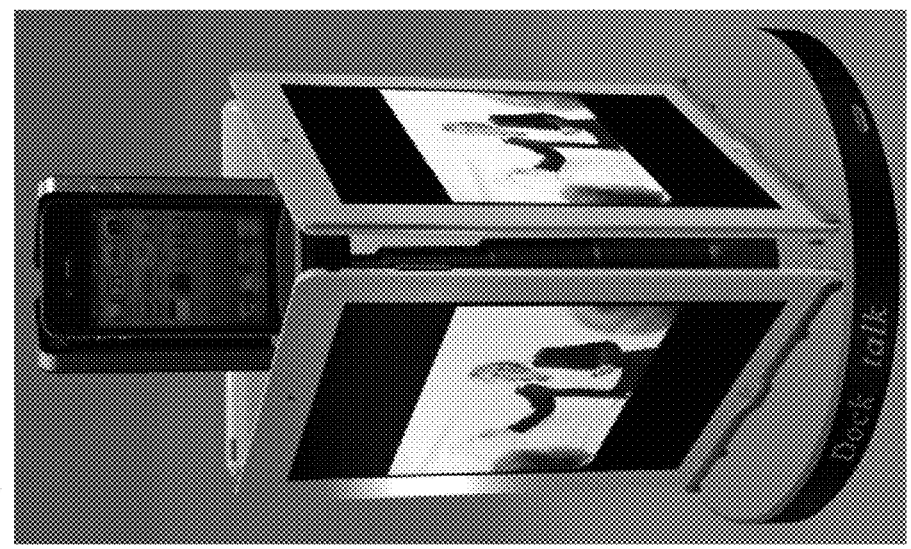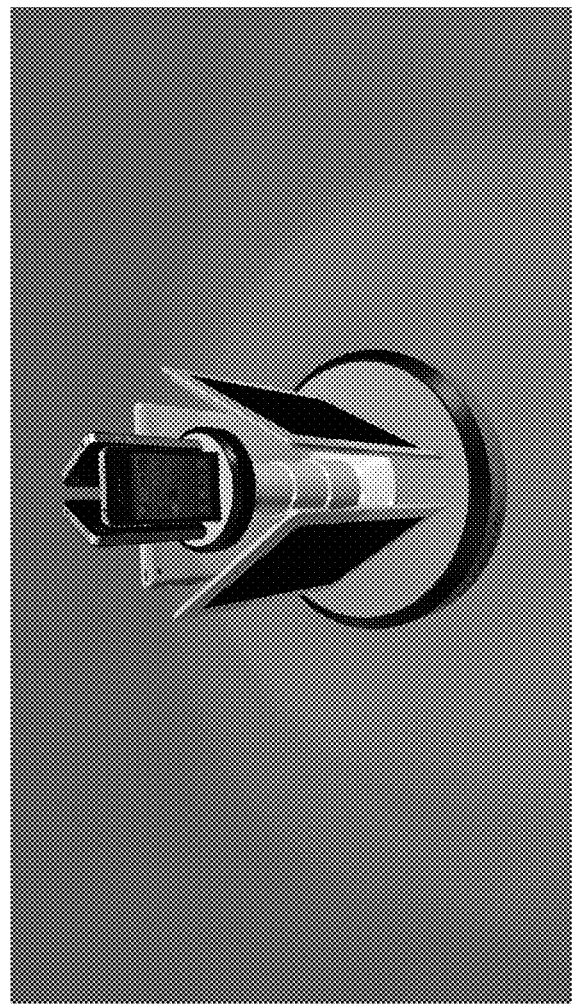
FIG. 20

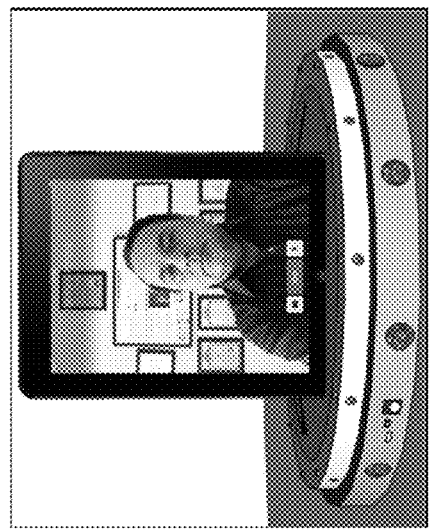
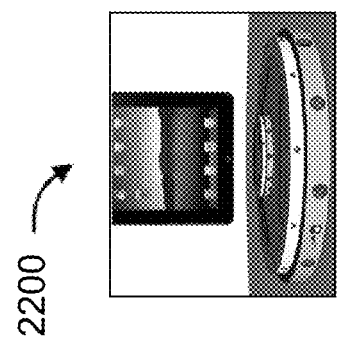
FIG. 22

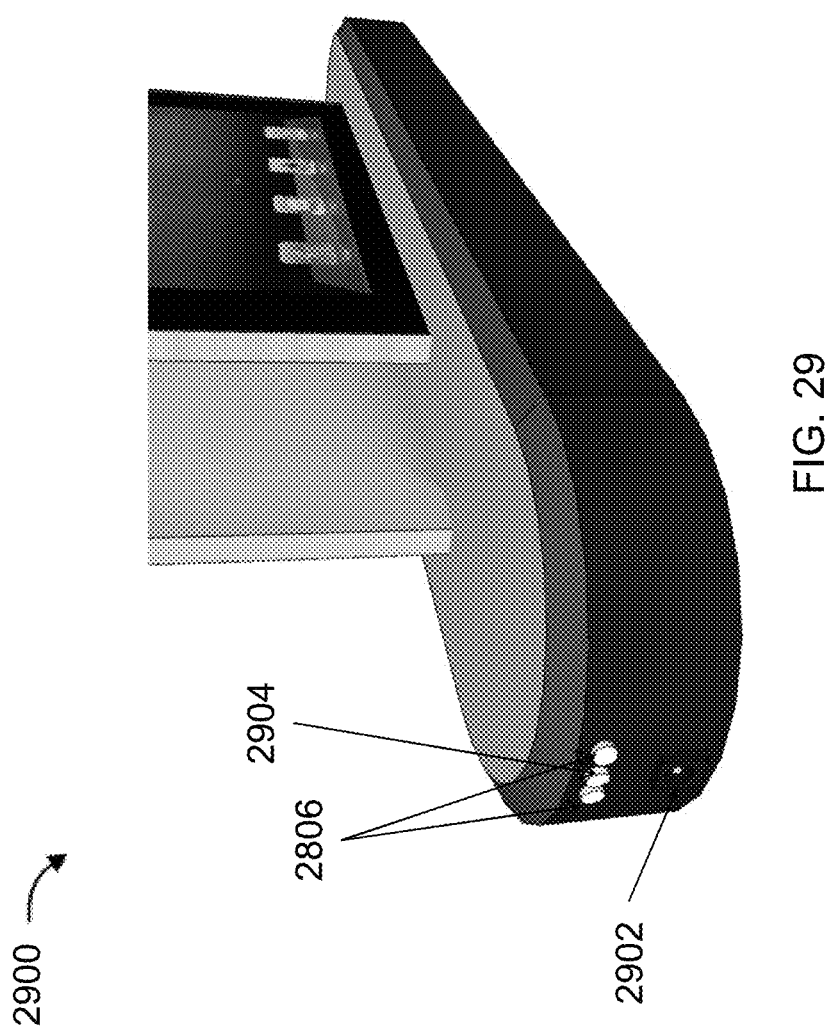

3000

3020

3040

3060

3080

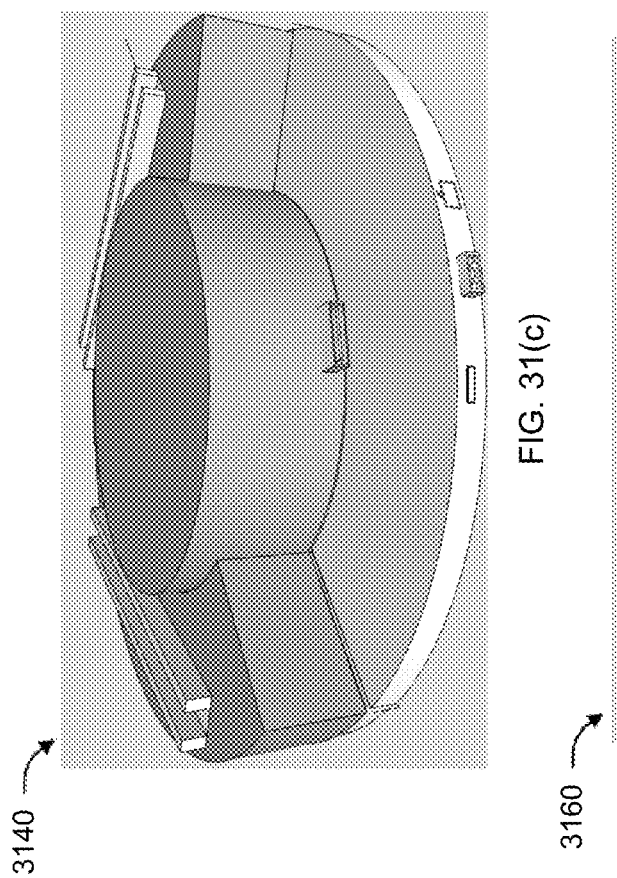
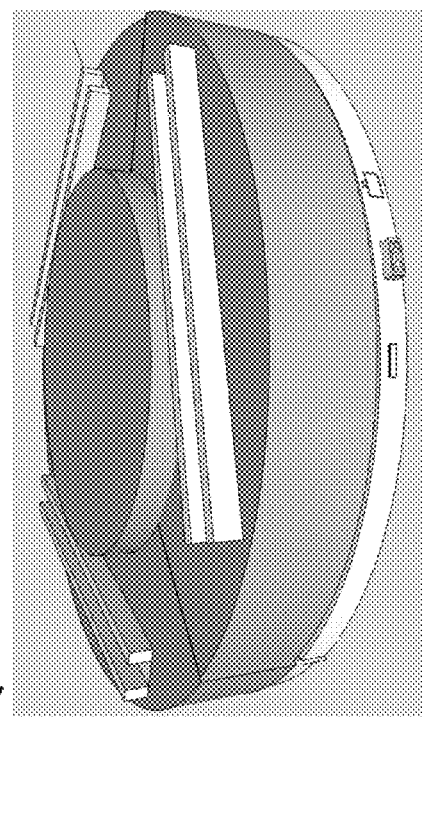

SYSTEM AND APPARATUS FOR SMART DEVICES BASED CONFERENCING

This application claims priority to the following U.S. provisional applications 61/924,071 filed Jan. 6, 2014, and 61/943,831 filed on Feb. 24, 2014. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD

The field of the invention relates to the domain of video conferencing.

BACKGROUND

The background description includes information that may be useful in understanding the present invention. It is not an admission that any of the information provided herein is prior art or relevant to the presently claimed invention, or that any publication specifically or implicitly referenced is prior art.

Video conferencing systems provide communication between at least two locations for allowing a video conference among participants situated at each location, wherein existing video conferencing arrangements are provided with one or more cameras such that output of such one or more cameras can be transmitted along with audio signals to a corresponding plurality of displays at a second location such that the participants at the first location are perceived to be present or face-to-face with participants at the second location.

Existing technologies do not support participant using their smart devices to attend video conferencing sessions, and also do not provide charging capabilities to the smart devices. Therefore, existing video conferencing apparatuses require participants to be present at the conferencing location in order to attend the video conference. Furthermore, due to the complexity of supporting video conferencing capabilities, existing video conferencing devices are not cost effective.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The present disclosure relates to a multi-site, multi-location, three dimensional video conferencing system that incorporates a conferencing apparatus that is operatively coupled with a server (say in the cloud), wherein the conferencing apparatus enables user's own smartphones and/or tablets to be inserted/detected therein to enable video conferencing to take place.

In an aspect of the present disclosure, user of the conferencing apparatus may use any of the existing smart devices such as smart phones and/or tablets along with the conferencing apparatus to do video conferencing or can use already configured/docked/installed smart devices to enable the video conferencing session to be initiated. In another aspect, video conferencing apparatus of the present disclosure provides user friendly features such as charging capabilities to the participant's smart devices so that the battery on the smart devices continues to charge while the participant attends the video conference. By supporting participant's smart device, the technology also provides a cost effective solution for video conferencing.

In another aspect, video conferencing apparatus of the present disclosure provides advantages of enabling participants to attend a video conference using their smart devices. Additionally, the technology disclosed herein also provides advantages of displaying a three dimensional avatar of the participant when the participant is not physically present at the video conferencing location. By way of example only, when a participant is running late to a video conference, the technology disclosed herein sends an invitation to the smart device of the participant and once the participant accepts the invitation, a three dimensional avatar of the participant can be displayed to other participants. However, once the participant docks the smart device to the video conferencing apparatus disclosed herein, the participant would be join the ongoing conference without any interruption.

In another aspect, system of the present disclosure provides security and authentication with the proposed conferencing apparatus such that a patient and a healthcare provider can communicate, in compliance with HIPPA, to receive medical treatment. In an exemplary implementation, a patient can dock his/her smart device using/into the conferencing apparatus at one location, and a healthcare provider such as a doctor can dock his/her smart device at another location and communicate via the conference call. Additionally, in view of the same healthcare example, the proposed system can include and/or be operatively coupled with one or more sensors and/or detectors related to patient vital sign monitoring. Additional security and authentication for communicating patient's vital sign data can be provided from these sensors, and detectors to the doctor's conferencing apparatus, in compliance with HIPPA.

Furthermore, conferencing apparatus of the present disclosure can be used in a school environment. By way of example only, pupils can use the proposed conferencing apparatus to dock their smart devices and initiate a video conference call with a teacher who also has a smart device docked in his/her conferencing apparatus. Using the technology disclosed herein, the teacher would be able to conduct classes for the pupils through the video conference. Additionally, when the pupils use their smart devices to browse a website during the video conference session, the proposed system can provide notification(s) to the teacher via the server that the apparatus is operatively configured with, and the teacher may then take necessary actions.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 10 illustrates another exemplary representation of smart devices showing docking status of one or more smart devices in accordance with an embodiment of the present disclosure.

FIG. 14 illustrates an exemplary representation of a smart device running a conferencing application and being docked on a conference apparatus in accordance with an embodiment of the present disclosure.

FIG. 20 illustrates yet another exemplary representation of the proposed conference apparatus showing outer and inner rotatable bases with smart devices docked therein in accordance with an embodiment of the present disclosure.

FIG. 22 illustrates an exemplary representation of the proposed conference apparatus with a docked smart device in accordance with an embodiment of the present disclosure.

FIG. 29 illustrates exemplary connectors/ports used in the proposed conference apparatus in accordance with an embodiment of the present disclosure.

FIGS. 31A to 31E illustrate another modular constructional representation of the proposed conference apparatus in accordance with an embodiment of the present disclosure.

DETAILED DESCRIPTION

Figure 1:
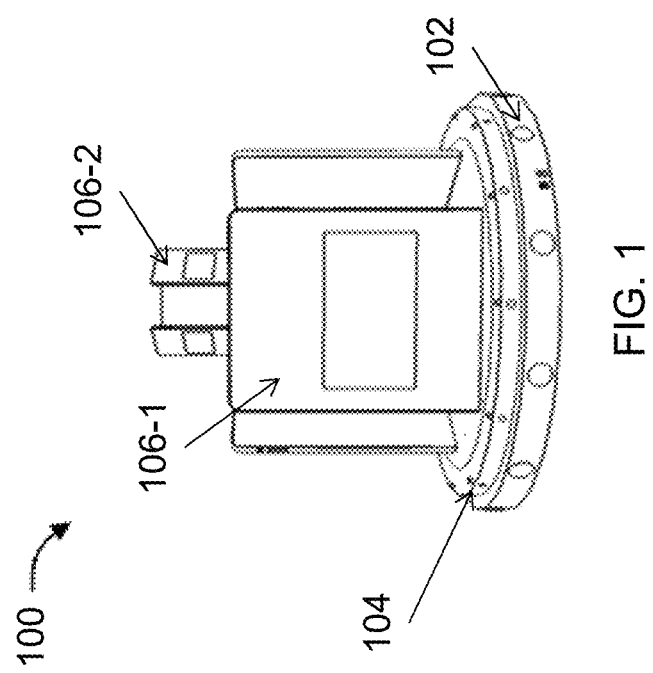
FIG. 1 illustrates an exemplary representation of proposed conference apparatus in accordance with an embodiment of the present disclosure.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM®, ColdFire®, GPU, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

One should appreciate that the disclosed techniques provide many advantageous technical effects including configuring and processing various feeds to determine behaviour, interaction, management, and response of users with respect to feeds and implement outcome in enhancing overall user experience while delivering feed content and allied parameters/attributes thereof.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

This technology relates to conferencing apparatus for integrating portable computing devices, such as smart computing devices, to enable enhanced performance of existing applications/function and creation of new applications for improved user experience. In the following description, numerous exemplary details are set forth in order to provide a thorough understanding of embodiments of the present disclosure. It will be apparent to one skilled in the art that embodiments of the present disclosure may be practiced without some of these specific details. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and firmware and/or by human operators.

Embodiments of the present disclosure may be provided as a computer program product, which may include a non-transitory computer readable medium tangibly embodying thereon instructions, which may be used to program a computer (or other electronic devices) to perform a process. The machine-readable medium may include, but is not limited to, fixed (hard) drives, magnetic tape, downloads from server, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In this example, a video conferencing apparatus is configured to combine two or more smart devices to achieve efficient video conferencing between multiple participants. Smart computing devices, also collectively referred to as smart devices hereinafter, can include a smart-phone, mobile device, tablet PC, hand-held pads, smart camera, interactive display boards, and surface computers, among other such devices having similar form factor, which are able to be docked to the conferencing apparatus. Conferencing apparatus of this example is not only configured to perform video conferencing, but can include all other allied video/image based operations or applications, such as connecting to one or more peripheral devices (projectors, televisions) for allowing display of still and/or moving images output via the conferencing apparatus.

The present disclosure relates to a multi-site, multi-location, three dimensional video conferencing system that incorporates a conferencing apparatus that is operatively coupled with a server (say in the cloud), wherein the conferencing apparatus enables user's own smartphones and/or tablets to be inserted/detected therein to enable video conferencing to take place.

In an aspect of the present disclosure, user of the conferencing apparatus may use any of the existing smart devices such as smart phones and/or tablets along with the conferencing apparatus to do video conferencing or can use already configured/docked/installed smart devices to enable the video conferencing session to be initiated. In another aspect, video conferencing apparatus of the present disclosure provides user friendly features such as charging capabilities to the participant's smart devices so that the battery on the smart devices continues to charge while the participant attends the video conference. By supporting participant's smart device, the technology also provides a cost effective solution for video conferencing.

In another aspect, video conferencing apparatus of the present disclosure provides advantages of enabling participants to attend a video conference using their smart devices. Additionally, the technology disclosed herein also provides advantages of displaying a three dimensional avatar of the participant when the participant is not physically present at the video conferencing location. By way of example only, when a participant is running late to a video conference, the technology disclosed herein sends an invitation to the smart device of the participant and once the participant accepts the invitation, a three dimensional avatar of the participant can be displayed to other participants. However, once the participant docks the smart device to the video conferencing apparatus disclosed herein, the participant would be join the ongoing conference without any interruption.

In another aspect, system of the present disclosure provides security and authentication with the proposed conferencing apparatus such that a patient and a healthcare provider can communicate, in compliance with HIPPA, to receive medical treatment. In an exemplary implementation, a patient can dock his/her smart device using/into the conferencing apparatus at one location and a healthcare provider such as a doctor can dock his/her smart device at another location and communicate via the conference call. Additionally, in view of the same healthcare example, the proposed system can include and/or be operatively coupled with one or more sensors and/or detectors related to patient vital sign monitoring. Additional security and authentication for communicating patient's vital sign data can be provided from these sensors and detectors to the doctor's conferencing apparatus, in compliance with HIPPA.

Furthermore, conferencing apparatus of the present disclosure can be used in a school environment. By way of example only, pupils can use the proposed conferencing apparatus to dock their smart devices and initiate a video conference call with a teacher who also has a smart device dock in his/her conferencing apparatus. Using the technology disclosed herein, the teacher would be able to conduct classes for the pupils through the video conference. Additionally, when the pupils use their smart devices to browse a website during the video conference session, the proposed system can provide notification(s) to the teacher via the server that the apparatus is operatively configured with, and the teacher may then take necessary actions.

As illustrated in FIGS. 1-31, conferencing apparatus of the present has a configuration that allows a plurality of smart devices (such as tablet PC's and mobile phones shown in FIG. 20) to be docked (in slots shown in FIGS. 18-19) and oriented in either a triangular, parallel, circular, or other relative formation with their front facing cameras facing outward and away from the center of the base. In an aspect, the conferencing apparatus such as shown in 100/200/300/among other figures, can be modular and can include a rotatable outer docking base 104 (such as in FIG. 2, the outer base is the one on which the tablet PC (bigger smart device) is configured), a removable and/or rotatable inner docking base 108 (such as in FIG. 2, inner base is the one on which mobile phone (smaller smart device) is configured), and one or more processors (not shown) housed within the outer 104 and the removable inner docking base 108. The apparatus can further include a stepper motor (not shown) that is communicably coupled with the one or more processors, one or more video output ports, or one or more microphones and/or speakers, although the conferencing apparatus can include other type, amount, configuration, pattern, and layout of components. In another embodiment, conferencing apparatus of the present disclosure can include a base 102 (such as shown in FIG. 1) comprising a top surface and a bottom surface, wherein the rotatable outer docking base 104 and the inner docking base 108 can be coupled to the base of the conferencing apparatus such that the outer 104 and inner docking bases 108 can be configured on the top surface of the base as illustrated in FIGS. 1-6, among other figures. In another example, the conferencing apparatus can also include a portable cellular-telephony transceiver as disclosed in U.S. application Ser. No. 12/945,406, which is hereby incorporated in its entirety.

As illustrated in FIGS. 1-31, outer docking base 104 and/or removable inner docking base 108 of the proposed conferencing apparatus can be circular in shape, although the outer and removable docking bases can be of other shapes. By way of example only, the removable inner 108 and the outer docking bases 104 can have a triangular shape, although either/both bases can have other polygonal shapes. In this example, the outer docking base 104 can be placed around the removable inner docking base 108 such that the outer docking base 104 and inner docking base 108 are concentric to each other. In this example, the outer docking base 104 can include a base receiving interface configured to receive the removable inner docking base 108, wherein one or more electrical contacts at the base receiving interface of the outer docking base can line up and connect with one or more corresponding electrical contacts configured on the removable inner docking base. As illustrated in FIGS. 1-31, the outer docking base and the inner docking base can be on an elevated platform. The elevated platform can be rotatable and can be configured with one or more docking bases (outer docking base and the inner docking base), which can receive one or more smart devices such as a smart phones and/or smart tablet 106.

According to one embodiment, outer 104 and/or inner docking bases 108 can be positioned such that correspondingly coupled smart devices 106 (106-1 configured on outer base 104 and 106-2 configured on inner base 108) are oriented with their rear sides or at least one side faces one another in order to allow smart devices to work in tandem and also allow taking of images/video of the participants in real time without having to rotate by the base. Furthermore, in order to create an unobstructed view of the cameras, outer and the inner docking bases can be positioned outwards or at an angle from each other to allow an unobstructed view at any given time. In another exemplary implementation, as most of the existing smart devices also have cameras on both the sides (front and rear), the outer/inner rotating plates of the base, when aligned to a particular participant of the video conference, can allow a front camera of one device and a rear camera of another device to view the same participant and take two images at any given time. Further, in this example, the rear facing camera of the first device needs to be in an offset position between the second device with the front facing camera and an adjacent device. Processing of two images or video streams can then allow creation a 3D image or video stream of the respective participant giving a more real-time experience.

In another exemplary embodiment, docking bases (outer docking base 104 and inner docking base 108) can be of any size, shape, orientation, or alignment so as to allow all smart devices 106 to be detachably mate with the base. By way of example only, the docking bases can be parallel to or at an angle with respect to one another to allow efficient use of space and image/video processing. To allow efficient connection with other hardware or firmware devices, conferencing apparatus can be configured to incorporate multiple ports, such as USB ports, HDMI ports, RJ-45 ports, among other such interfaces/ports for enabling functions relating to power, switching, display, transmission, reception, among other such other functions.

Figure 2:
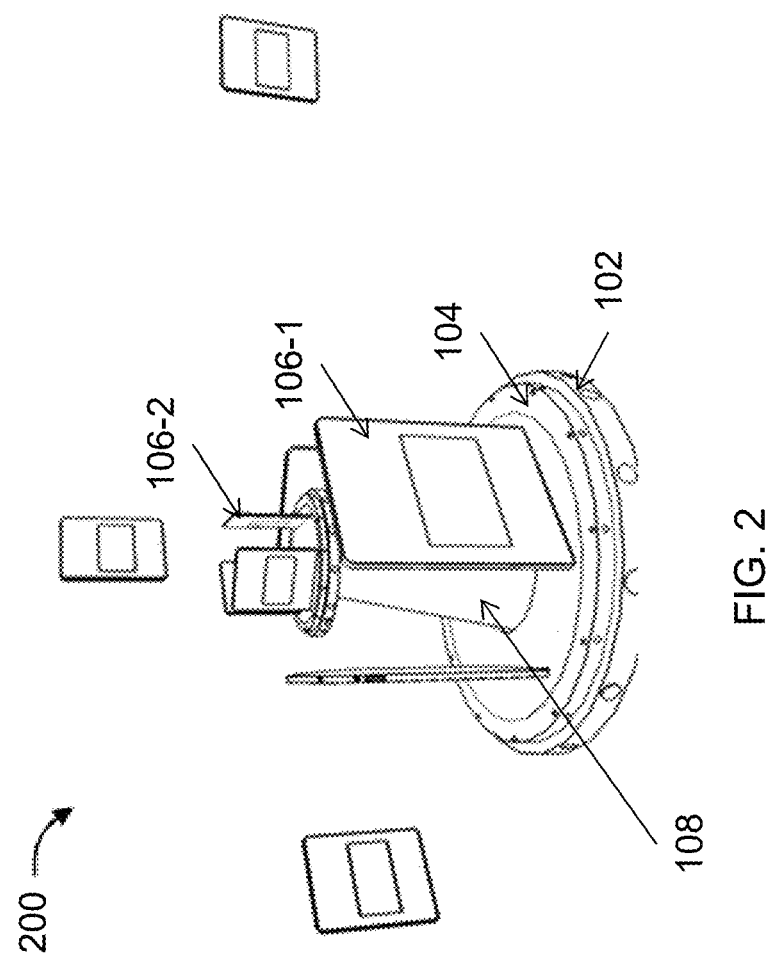
FIG. 2 illustrates an exemplary representation of proposed conference apparatus having an inner docking base with telescopic means to dock one or more smart devices therein in accordance with an embodiment of the present disclosure.
Figure 3:
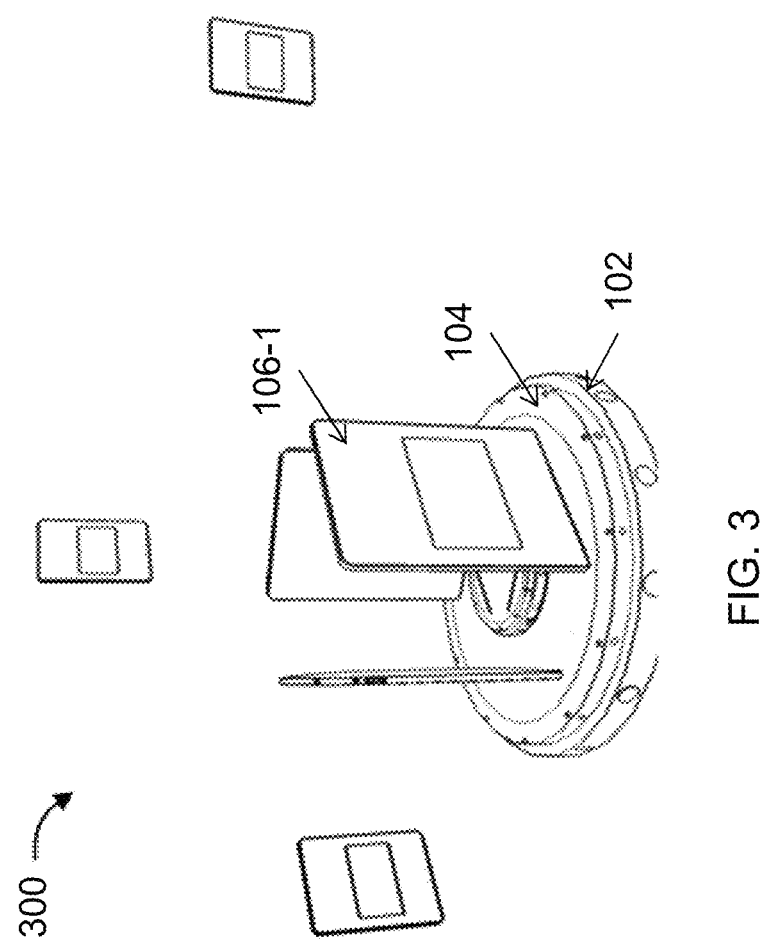
FIG. 3 illustrates an exemplary representation of proposed conference apparatus in accordance with an embodiment of the present disclosure.
Figure 4:
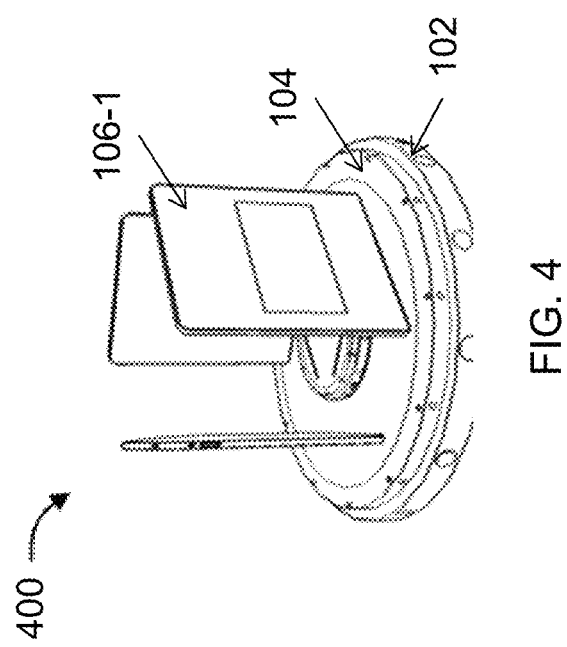
FIG. 4 illustrates an exemplary representation of proposed conference apparatus in accordance with an embodiment of the present disclosure.

Additionally, as illustrated in FIGS. 2 and 18-20, the removable inner docking base 108 can be slightly or substantially elevated with respect to the outer docking base. When the outer docking base 104 and the removable inner docking base 108 are coupled to one another, the removable inner docking base 108 can be extended to be at a telescopic level higher than the devices docked on the outer base, as shown in FIGS. 2 and 20. In this example, the removable inner docking base 108 can be extended away manually or automatically from the outer docking base 104 and when extended away, the removable inner docking base 108 can be converted to a telescopic inner docking base 108 as illustrated in FIG. 2. When outwardly extended, docking positions for detachably securing smart devices 106 in the inner base 108 can be offset from the docking positions for detachably securing smart devices in the outer base 104 by say 60 degrees with respect to the center of the outer docking base 104 to allow 360 degree coverage when all the smart devices 106 are docked at the same time. One should appreciate that the inner base 108 can be offset to other angles convenient for conferencing. In an aspect, the removable inner docking base 108 can be rotatable or can be fixed with respect to the outer docking base 104 as illustrated in FIG. 20. However, in another example, the outer docking base 104 also can be rotatable. The outer 104 and removable inner docking base 108 can be configured to receive one or more smart devices 106 from the same family or different family of smart devices, such as Apple™-only, Android™-only, Apple™ on the outer and Android™ on the inner base or similar other cross combinations depending on the preferred choice of product realization. In this example, the electrical wiring extensions to the inner smart devices are through the telescopic inner docking base.

According to another embodiment, conferencing apparatus of the present disclosure can include one or more processors that can be housed within the outer docking base, and/or in the removable inner docking, although the processor can be housed within the base of the conferencing apparatus. The one or more processors can be configured to execute programmable instructions or any other code that is embodied in a memory configured within (or operatively/remotely coupled with) the apparatus to be coupled to and to manage and control the operation of the speakers and/or microphones within the conferencing apparatus. The apparatus can further include a stepper motor that is housed within the conferencing apparatus enables rotation of any of the base 102, outer docking base 104, and inner docking base 108. According to another embodiment, smart devices 106 including other types and numbers of systems, devices, components, and/or other elements can be coupled to and managed and controlled by the one or more processors.

In an exemplary implementation, instead of using one or more processors, a single board computer (SBC) logic can be implemented to control the outer docking base, the inner docking base, speaker operation, microphone operation, platform operation, rotating plate operation, among other components of the video conferencing apparatus. In one example, the single board computer logic can be housed within the outer docking base and/or the removable inner docking, although the processor can be housed within the base of the conferencing apparatus.

According to another embodiment, conferencing apparatus of the present disclosure can include one or more speakers for audio outputs and one or more microphones for audio inputs from participants of the video conferencing, wherein configuration and/or placement of speakers and microphones can be positioned in any desired portion/location of the inner and/or outer docking base or even in the base of the conference apparatus. Speakers and microphones can be communicably coupled to processors within the conferencing devices, wherein, when the smart devices are detachably coupled to the conferencing apparatus, microphones and/or speakers of the smart devices can be turned off and speakers and microphones of the conferencing apparatus can be used for video conferencing. Alternatively, in another example, microphones and speakers of the conferencing apparatus can be turned off and microphones and speakers of the smart devices can be used for the purpose of video conferencing, although the combination of speakers and microphones in both the smart device and the conferencing apparatus could be used. Any other configuration and/or change in architecture is completely within the scope of the present disclosure. In an exemplary implementation, inner and/or outer docking base can include one or more microphones that can receive audio and/or speakers to output audio that can operate when the bases are electrically coupled with one another. It should be appreciated that any positioning or specific placement of the speakers and/or the microphones is covered within the scope of the present disclosure. By way of example only, speakers can be positioned on peripheral side of the outer docking base, whereas microphones can be positioned on peripheral side of an elevated platform formed on the outer docking base. In another example, both speakers and microphones can be positioned on the base such that there is at least one speaker and at least one microphone per each docking position on the base. Alternatively, in another example, both speakers and microphones can be positioned on the elevated platform.

Additionally, in this example, the conferencing apparatus can include an indicator, such as a LED indicator, communicably coupled to the processors to indicate whether a microphone is active at that instant, although other types and numbers of displays can be used. In an embodiment, indicator can be controlled by one or more processors when a microphone and/or video camera is activated (which can be based on detected microphone energy/strength, internal switching or manual switch by one of the video conference participants). As the design, position, and configuration of speakers and/or microphone can be changed as desired, position of indicators can also be changed such that it on the base or a raised platform of the base.

In another aspect, conferencing apparatus of the present disclosure can include a stepper motor that can be housed within a base of the conferencing apparatus, wherein the stepper motor can be communicably coupled to processor(s) of the conferencing apparatus and can also to rotatable outer and the inner bases. Stepper motor can also be configured to rotate outer and inner bases based on signal/input received from one or more processors of the apparatus.

Figure 21:
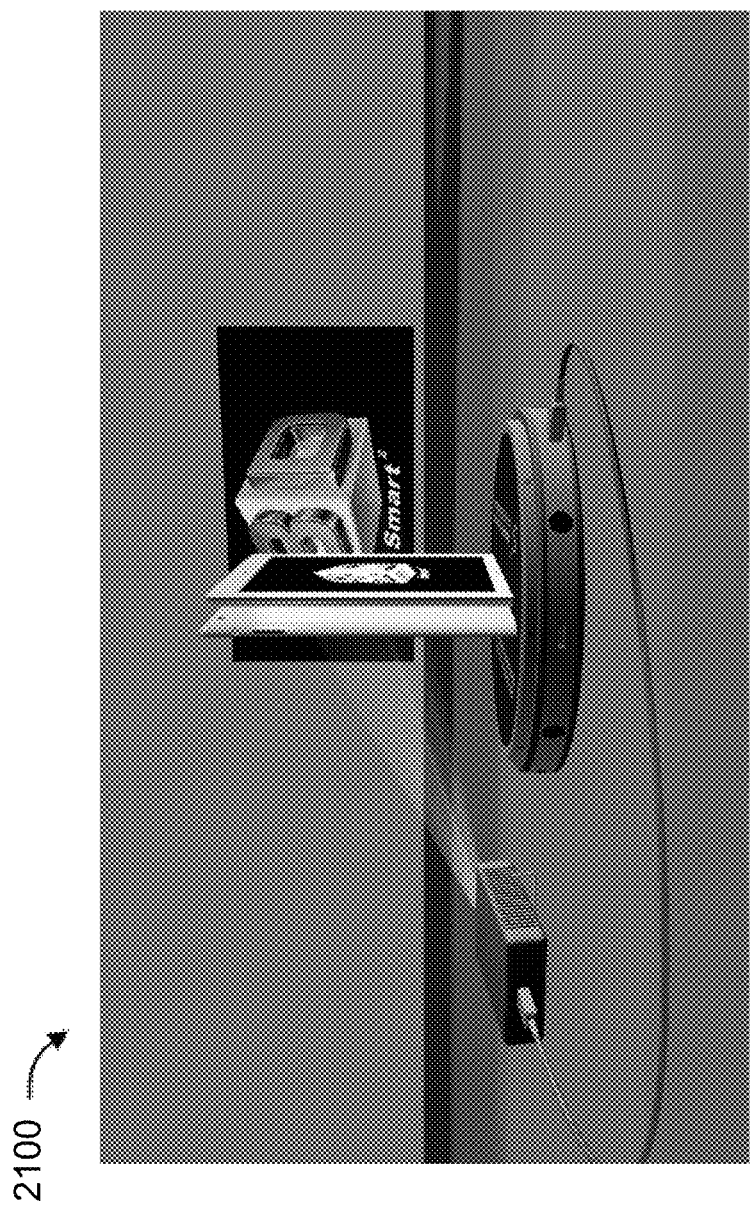
FIG. 21 illustrates an exemplary representation of the proposed conference apparatus that is operatively coupled with an external projector means in accordance with an embodiment of the present disclosure.
Figure 23:
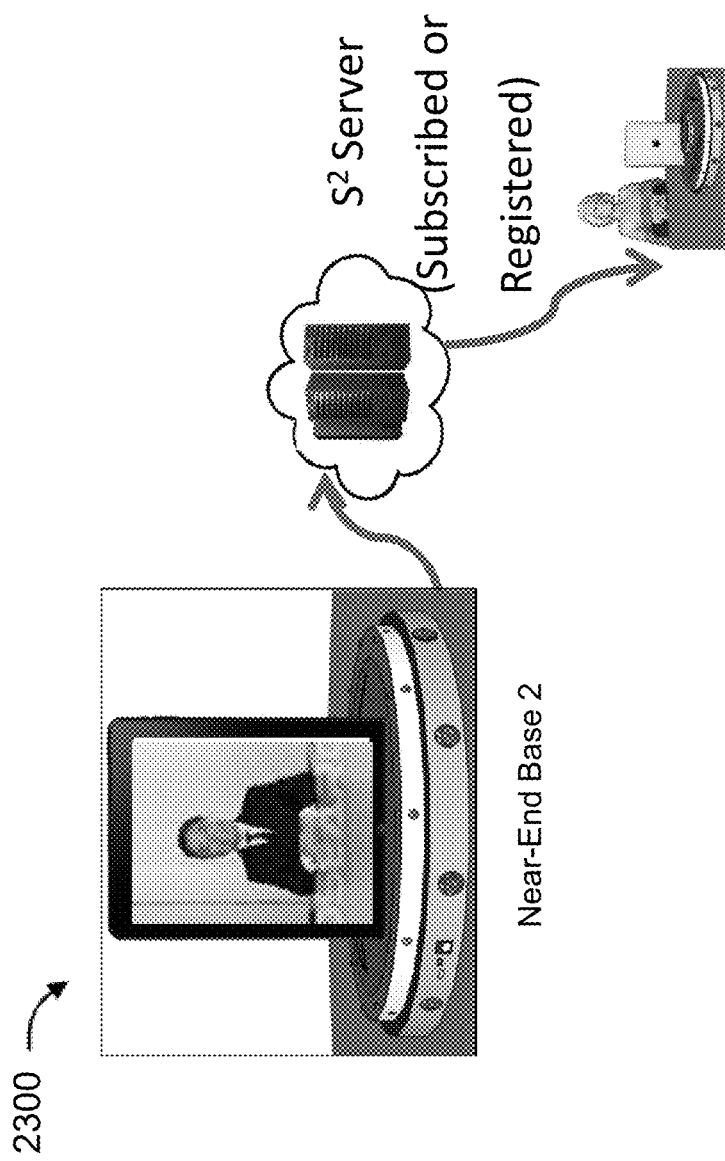
FIG. 23 illustrates an exemplary representation of two smart devices connected with each other over a video conference call using the proposed conference apparatus in accordance with an embodiment of the present disclosure.
Figure 24:
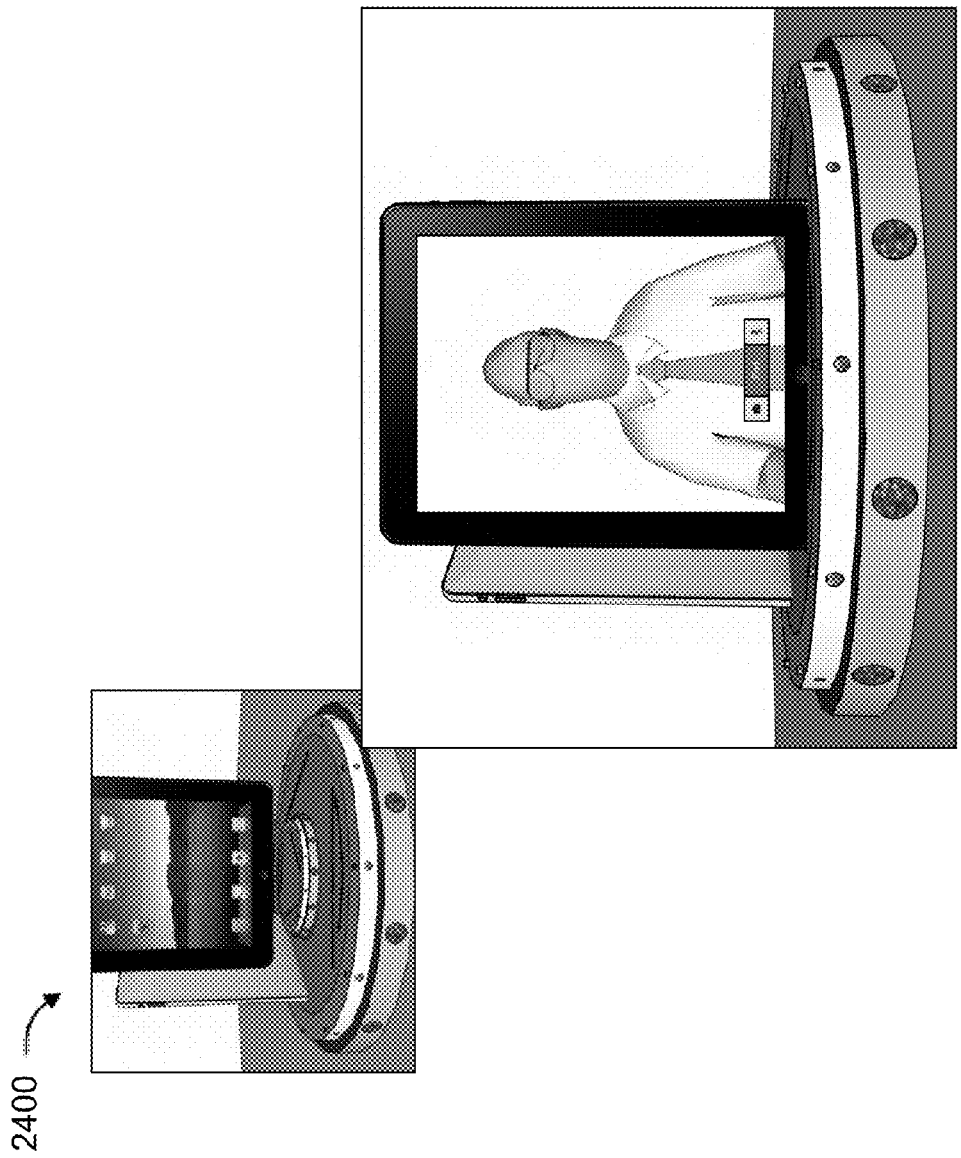
FIG. 24 illustrates an exemplary representation of the proposed conference apparatus with two docked smart devices in accordance with an embodiment of the present disclosure.
Figure 25:
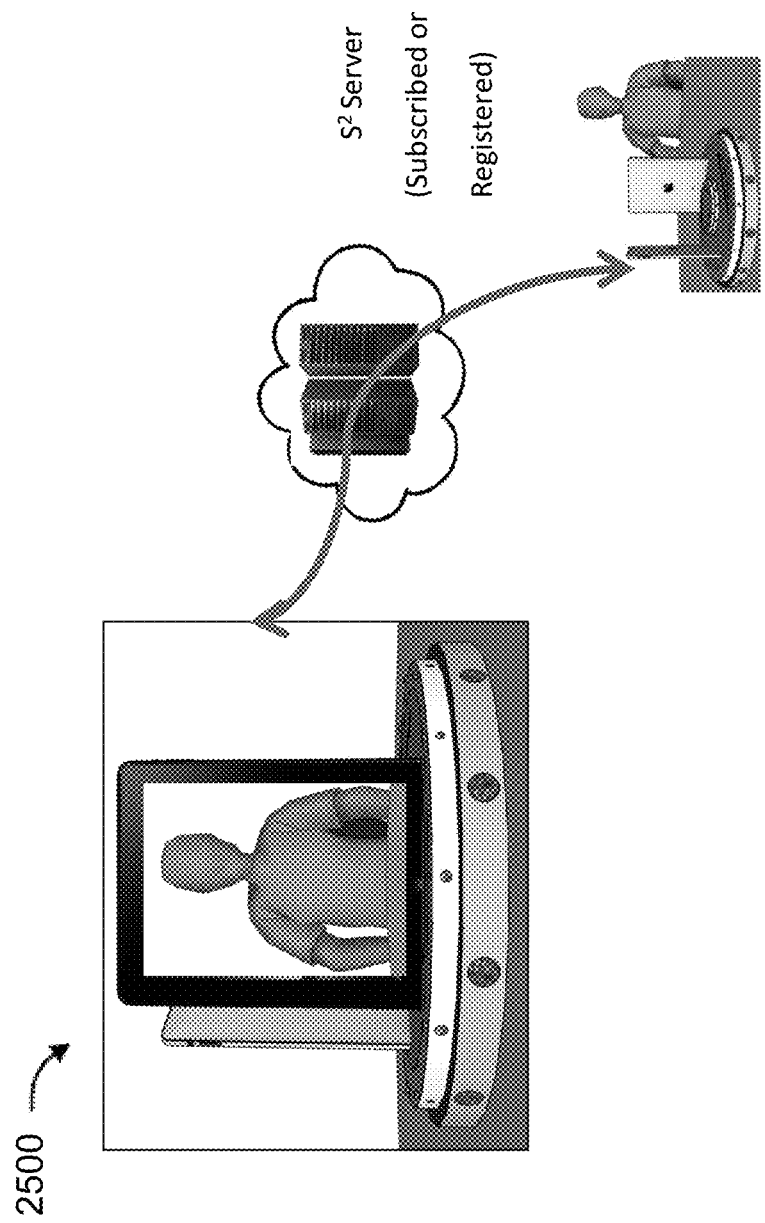
FIG. 25 illustrates an exemplary representation of a second user being connected to a conference session by docking his/her device into the proposed conference apparatus in accordance with an embodiment of the present disclosure.
Figure 26:
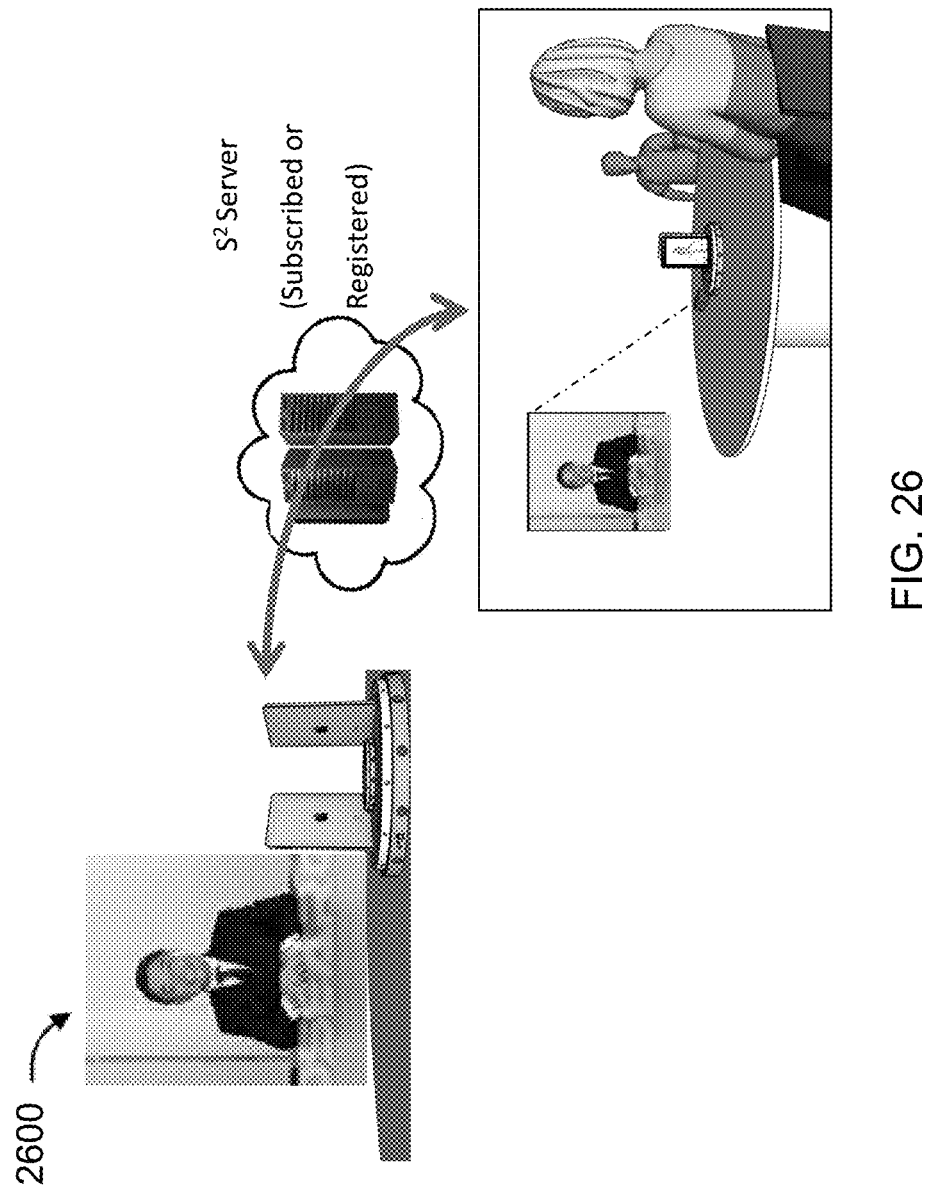
FIG. 26 illustrates an exemplary representation of a second user being connected to a conference session by docking his/her device into the proposed conference apparatus and use of an external projector means in accordance with an embodiment of the present disclosure.
Figure 27:
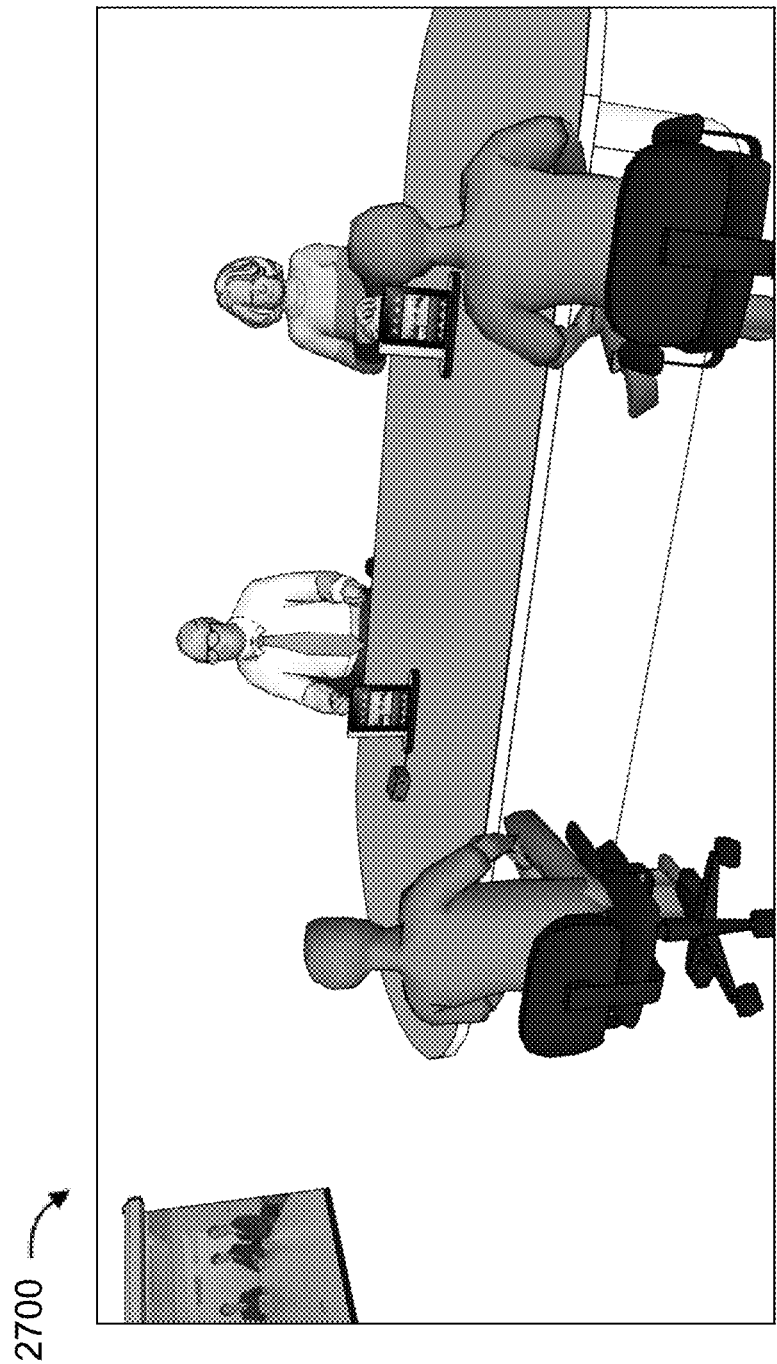
FIG. 27 illustrates an exemplary representation of multiple users being rendered in a 360 degrees panoramic view pattern using the proposed conference apparatus in accordance with an embodiment of the present disclosure.

In another aspect, conferencing apparatus of the present disclosure can include one or more ports/communication interfaces connected to processors that allow connection of one or more projectors, flat-panel displays, or other desired devices to conferencing apparatus as illustrated in FIG. 21. In an aspect, the one or more ports/communication interfaces can be operatively coupled with the docked smart devices. In an exemplary implementation, conferencing apparatus can be connected to a television or to a projector using one or more ports/communication interfaces. By way of example only, when a smart device is docked-in to the conferencing apparatus, the smart device's display can be mirrored on HDMI TV or projector type device connected through one of the ports/communication interfaces, such as a HDMI port.

Figure 18:
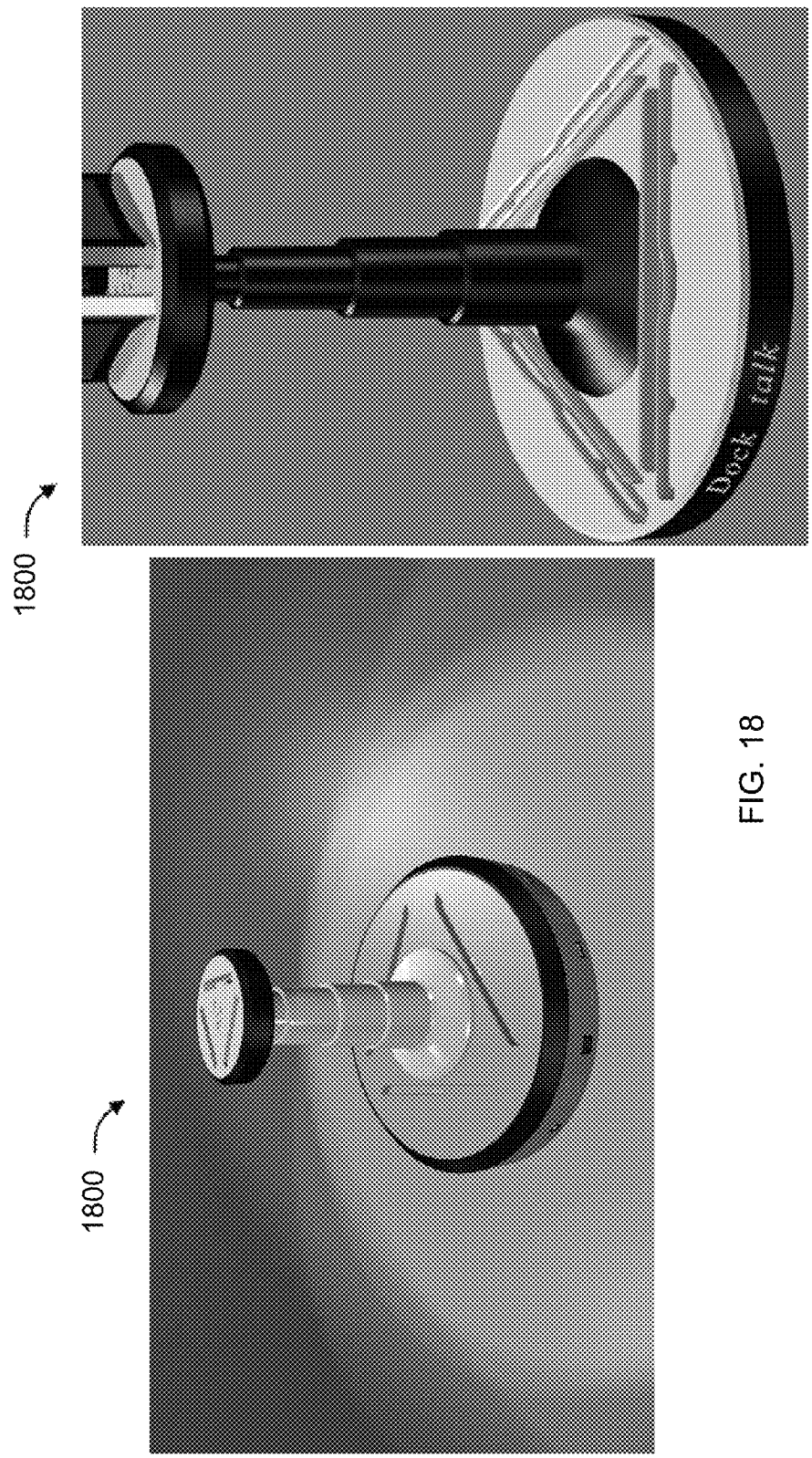
FIG. 18 illustrates an exemplary representation of the proposed conference apparatus showing outer and inner rotatable bases in accordance with an embodiment of the present disclosure.
Figure 19:
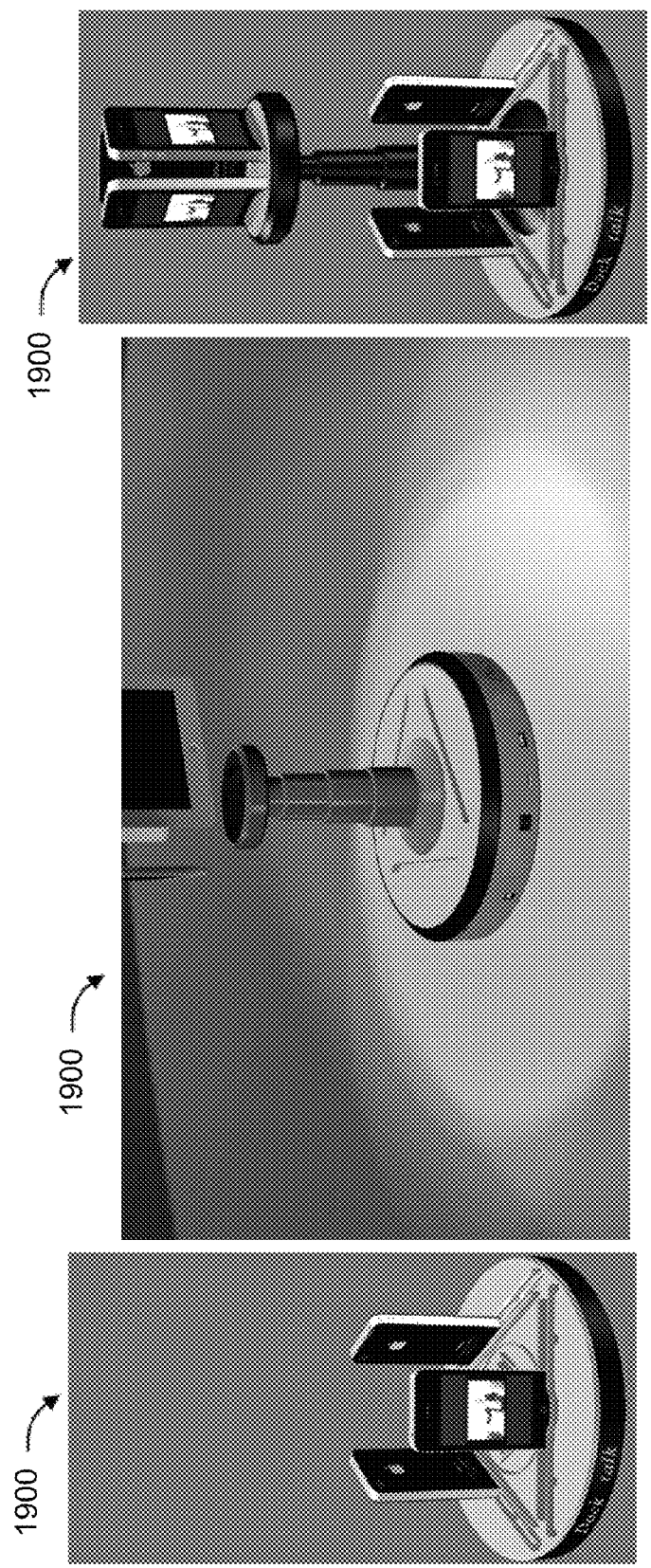
FIG. 19 illustrates another exemplary representation of the proposed conference apparatus showing outer and inner rotatable bases in accordance with an embodiment of the present disclosure.

In another exemplary implementation, base of the proposed conference apparatus can include an outer base and/or an inner base, any or both of which can receive one or more smart devices in order to initiate a video conference. By way of example only, the smart devices can be placed on one of the receiving ports/slots of the base of the conferencing apparatus as illustrated in FIGS. 18-20, wherein upon receiving the smart devices on the base, electrical power and data transfer capabilities within the conferencing apparatus can be enabled to allow inner base and outer base to communicate with one another. In an aspect, inner docking base can include requisite hardware and software components such as RJ-45 Ethernet, JTAG programming via USB2 port by way of example only, to allow data, such as video, audio and control signals to be communicated with the outer base and/or other electronic devices, although other types of hardware and software components can be present. In another example, either or both of the bases contain same external interfaces. Additionally, when the conferencing apparatus receives the smart devices, a protocol handshake between the conferencing apparatus and docked smart devices can be performed in order to identify type of smart device (such as Apple™ device or an android based device) and for smart devices to source multimedia streams to rotatable docking bases (outer docking base and/or the inner docking base).

In another aspect, smart devices can be configured on docking bases such that, along with enabling the functionality of video conferencing through their respective cameras, the devices also can be operatively coupled to allow one or more of charging, data transfer, transfer of sessions, and transfer of settings, among other desired functionalities. Connections between multiple smart devices can be used for one or more of data transfer amongst devices, session migration from one device to another, sequential processing of a given set of instructions, functions or applications, and parallel processing of a given set of applications or functions, among other such purposes. Further, the outer and removable inner docking bases can both be configured to function as a charging base so that any detachably coupled smart devices automatically charges when docked into the two bases. By way of example only, when the removable inner docking base is docked into the outer docking base, data and power interfaces of the conferencing apparatus can be securely engaged to allow full interconnection between the two bases as well as their respective docked smart devices.

One should appreciate that although the present disclosure is being explained with reference to the apparatus having both outer and inner bases, the apparatus can be configured only with an outer or only with an inner rotatable base or simply as a single rotatable/non-rotatable base that has a plurality of slots that can accommodate all types of smart devices and enable the video conferencing sessions to be carried out.

Figure 11:
FIG. 11 illustrates another exemplary representation of how smart devices can show upcoming conference notification in one or more smart devices in accordance with an embodiment of the present disclosure.
Figure 12:
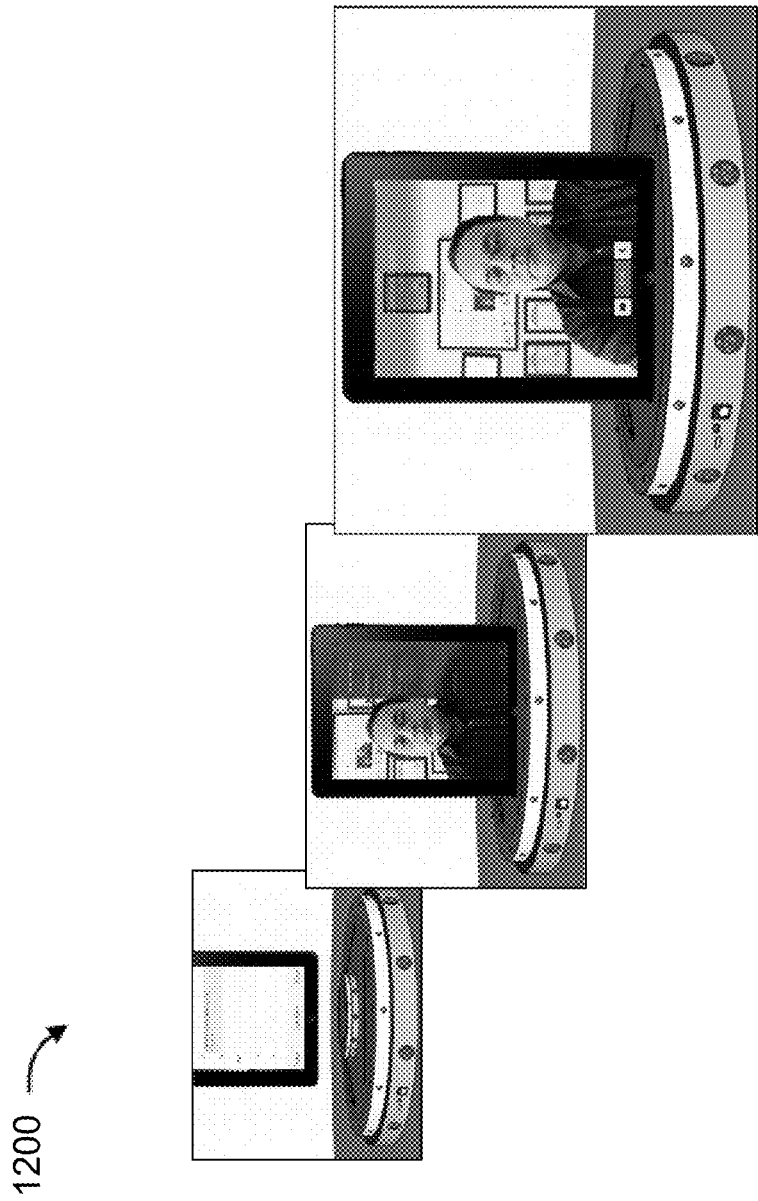
FIG. 12 illustrates another exemplary representation of smart devices showing an ongoing video conferencing session in accordance with an embodiment of the present disclosure.
Figure 13:
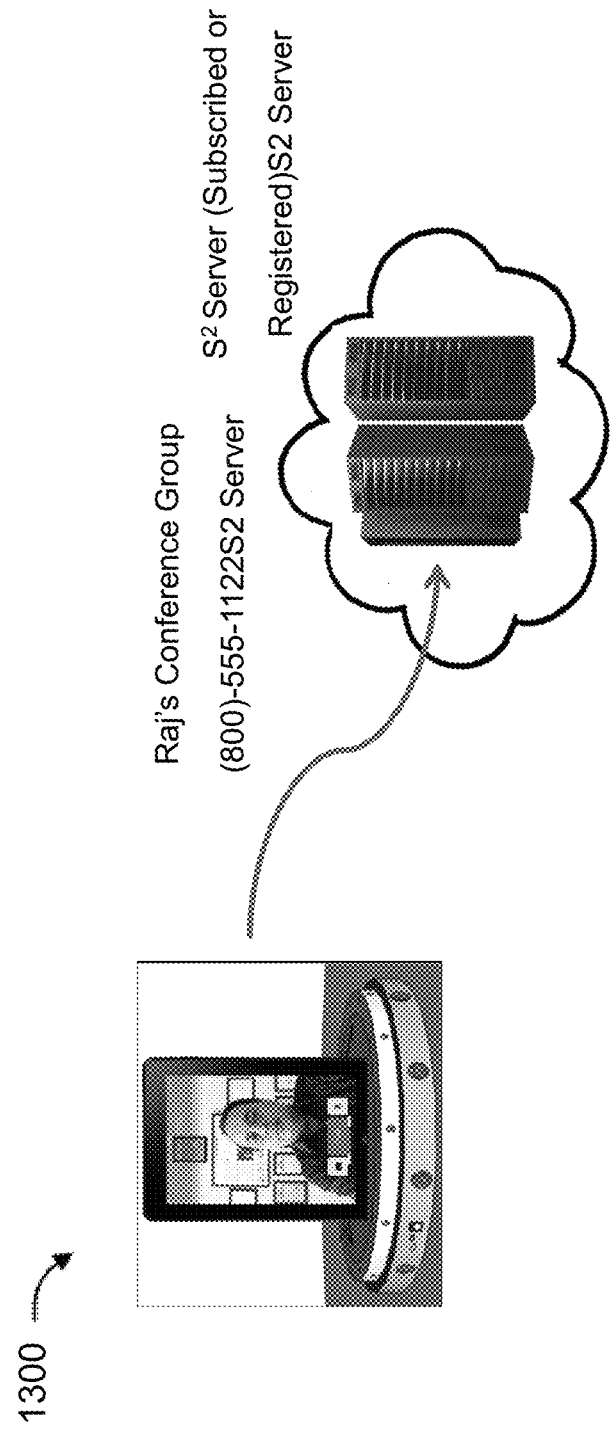
FIG. 13 illustrates an exemplary representation of a smart device being operatively connected with a video conferencing server that enables multiple participants to join in order to execute conference sessions in accordance with an embodiment of the present disclosure.

As illustrated in FIG. 2, outer docking base and removable inner docking base can be configured to allow one or more docked smart devices to together communicate with one or more other recipient participants via a network connection, although the one or more docked smart devices can communicate with other recipient participants using other techniques. By way of example only, the recipient participants may be participating on the conference using one or more smart devices docked to another conferencing apparatus or other types of conferencing device such as a laptop, non-docked smart device, desktop, or a kiosk. Optionally, the smart device of the participant may also get a meeting notification from a calendar event present within the smart device as illustrated in FIG. 11.

Figure 15:
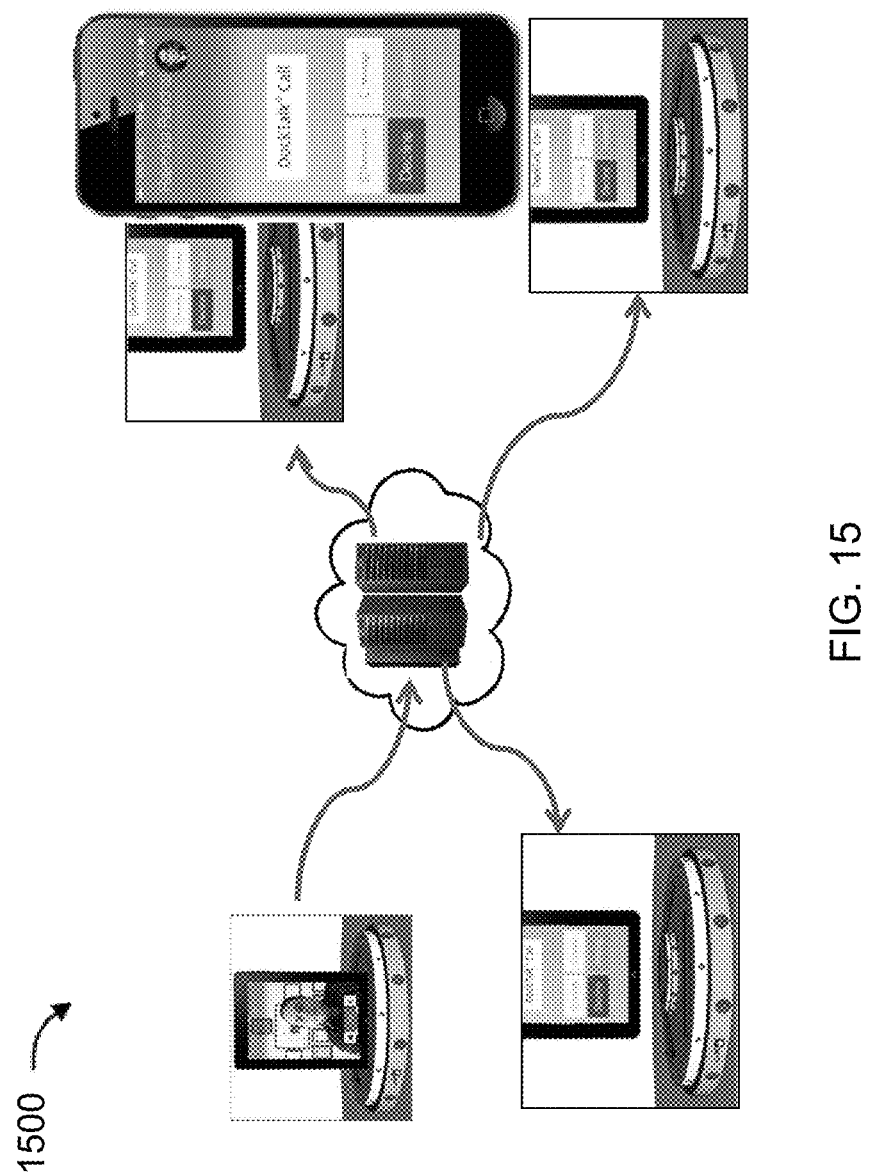
FIG. 15 illustrates an exemplary representation of smart devices being operatively connected with a video conferencing server that enables multiple participants to join in order to execute conference sessions in accordance with an embodiment of the present disclosure.
Figure 16:
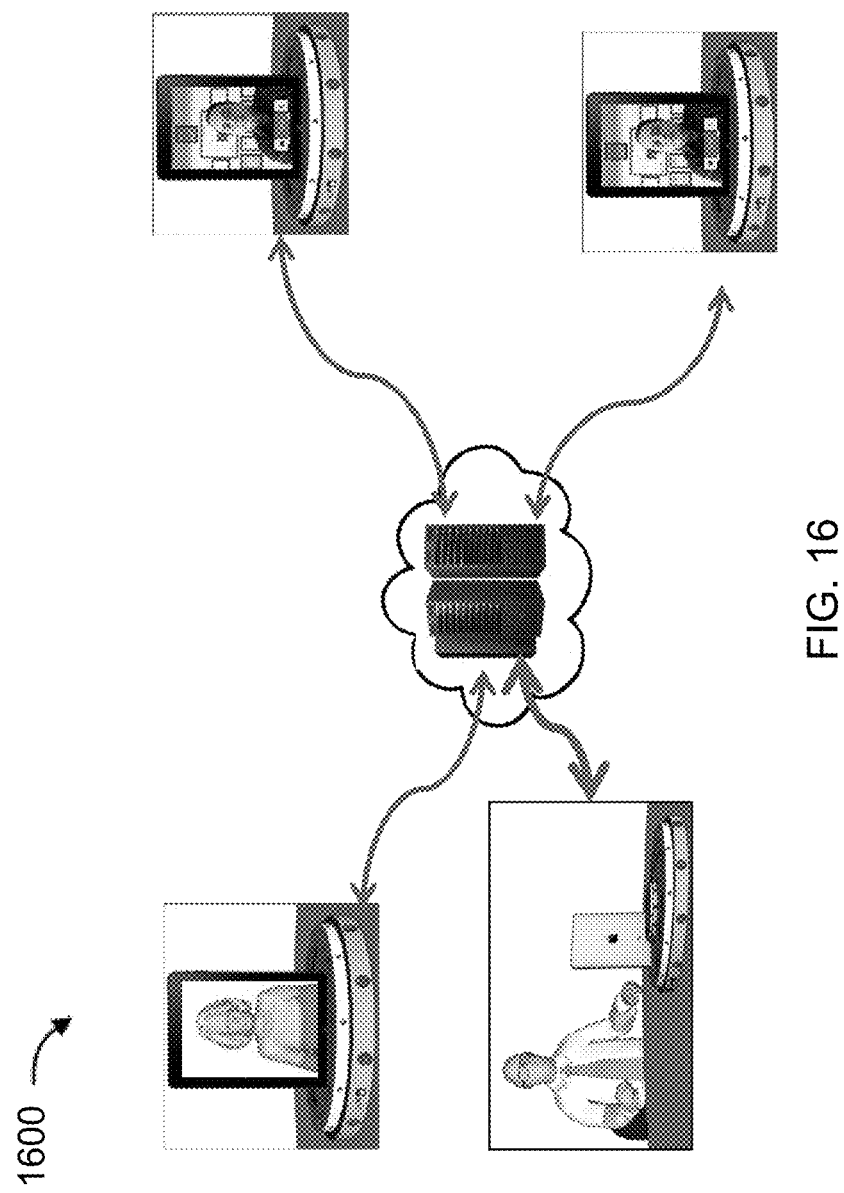
FIG. 16 illustrates an exemplary representation of smart devices being operatively connected with a video conferencing server that enables multiple participants to join in order to execute conference sessions in accordance with an embodiment of the present disclosure.
Figure 17:
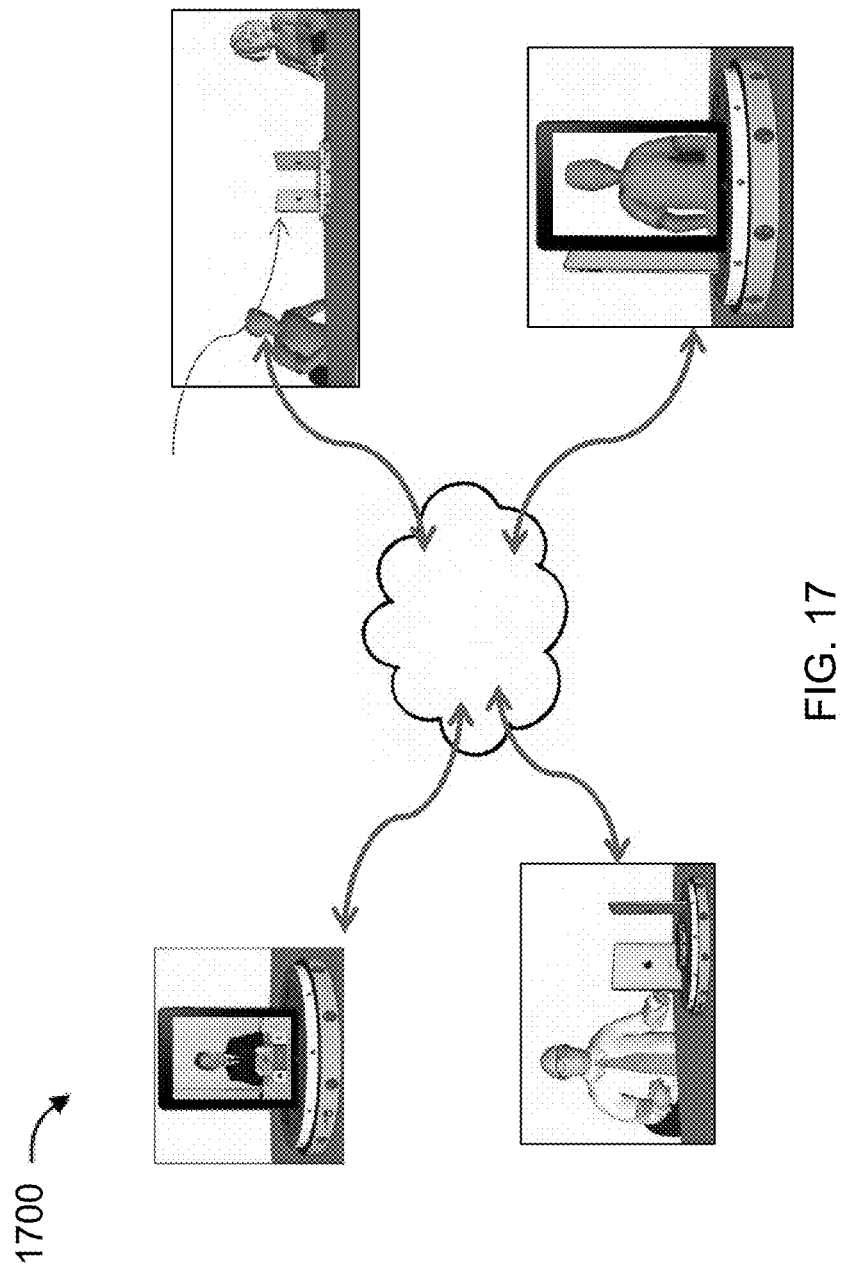
FIG. 17 illustrates an exemplary representation of smart devices being operatively connected with a video conferencing cloud that enables multiple participants to join in order to execute conference sessions in accordance with an embodiment of the present disclosure.

In another aspect, one or more of the detachably coupled smart devices can initiate a video conferencing session using the proposed conferencing apparatus with participants at other locations. By way of example only, the participant can initiate video conferencing by selecting/executing an application configured/installed on the smart device as illustrated in FIG. 14-15, although the participant can imitate the video conference using other techniques as well and all such means are completely within the scope of the present disclosure. In an exemplary implementation, processor or communication interface of the conferencing apparatus can be configured to establish a bridge between participants of the conference, wherein the conferencing apparatus can support a full-fledge SIP proxy that enters into a signaling and media path between, for example, Apple's™ FaceTime™ SIP server or Skype™ SIP server on the network side and detachably coupled smart devices, thus supporting a traditional multi-party multi-media conference call with added co-location detection and local features on the base. Additionally in this example, conferencing apparatus may be configured to host a SIP proxy or a Back-to-Back User Agent (B2BUA) that establishes and maintains a conference connection over a secured corporate intranet or LAN and/or a public network (i.e. Internet).

In another exemplary implementation, a participant may get a video conference call from another participant at another location. For instance, with reference to FIGS. 13-16, when a participant by name Raj selects an O'Face application on his smart device to place a call to another participant by name Arun, server of the proposed system/architecture can place a Face Time™ call to Arun, and show the calling party as Raj O'Face Contact, not a server as illustrated in FIG. 14. In this example, as illustrated in FIG. 14, participant by name Arun has an option of accepting the call as a regular video conference call using any standard application such as Face Time™ call, or can choose to detachably connect his/her smart device to the conferencing apparatus to accept the video call. Additionally, any number of participants can be added to the existing video conference call either by adding new participants or new participants connecting their smart devices to the conferencing apparatus as illustrated in FIGS. 15-17 and FIGS. 22-27. In an implementation, when a new participant is added to the videoconference, server of the present architecture/system that is coupled to the conferencing apparatus can obtain identity of the new participant from the conferencing apparatus and can broadcast the information to other participants on the videoconference. As previously illustrated, when a participant is not available for the videoconference, a three-dimensional representation (avatar) of the participant can be displayed on a projector or a TV coupled to the conferencing apparatus illustrated in FIG. 27.

In an exemplary implementation, when an additional user wants to join a conference through the proposed conferencing apparatus, the user may simply dock his/her smart device on any available dock, wherein processor(s) of the conferencing apparatus identify the new smart device based on a handshake protocol and allow communication data to be sent to and received from the newly docked smart device, and a conferencing software application executed on the device/conferencing apparatus can be enabled/executed to enable the user to join and participate in an ongoing or a new videoconference. Further, conferencing apparatus of the present disclosure can be configured to utilize identification of newly docked-in additional conference participant and this identification may be shared among other participants currently on the conference.

Upon initiation of a videoconference, one of the participants can begin/initiate the conference/conversation. In this example, microphones of the conferencing apparatus can receive audio signals from the first participant and can transmit these audio signals to the processor of the conferencing apparatus. In this example, processors can be configured to measure signal strength coming from each microphone of the apparatus and detect strongest signal and microphone associated with the strongest signal. Strongest signal strength can point to the primary participant speaking during the video conferencing session, based on which processors can activate corresponding microphone and camera of the smart device that is in proximity of the person talking and deactivate or minimize the effect of all other microphones and nearest speakers to reduce near-end or self-feedback. Speakers of the conferencing apparatus can be configured with feedback avoidance logic so as to reduce/remove the noise, interference, or any other undesired component from any of the speaker output or microphone input. Each speaker can also be configured so as to cause least near-end or self-feedback from other speakers. Additionally in this example, when the microphone is activated, an indicator associated with the activated microphone can be turned on. Further, once the microphone is activated, processors using the stepper motor housed within the conferencing apparatus to rotate the outer docking base or the inner docking base to allow appropriate or desired alignment of the smart device and camera thereof to view the active speaker based on the strongest signal strength.

According to another embodiment, conferencing apparatus, using one or more processors and stepper motor(s), and based on audio energy/strength signals received, can rotate its base such that one smart device is aligned in the direction of the strongest audio energy, enabling front facing camera of the smart device to point to the speaking conference participant. However, if another smart device with a back facing camera is also docked in the docking base, the back facing camera of the smart device also points in the same direction to that of the first smart device camera allowing two video streams from the same direction to be processed for 3D image compatible flat panel displays.

In another aspect, SBC logic housed within the conferencing apparatus can be configured to detect audio energy and determine direction of strongest microphone and use the knowledge to enhance audio performance by selectively decreasing/increasing sensitivity of selected microphones as well as lowering output of speakers closest to the strongest microphone.

Upon accurately rotating the base to capture video of the speaking participant in the conference, processor and/or communication interfaces of the conferencing apparatus can allow docked-in smart devices to transmit video information via a communication channel such as internet or LAN. The conferencing apparatus can allow this transmission, first by triggering the receipt of video from other inserted cameras to the transmitting phone. By way of example only, the conferencing apparatus can trigger receipt of video by the strongest audio energy detection as previously illustrated in greater detail, although the conferencing apparatus can use other techniques such as by remote or manual intervention by a privileged user of the conferencing apparatus. The remote command can be generated either locally or at the far end of the conference. Additionally, conferencing apparatus provides capture integration of multiple point-to-point FaceTime™-like session, thereby creating a multi-point FaceTime™-like conferencing without modifying any functionality of point-to-point FaceTime™-like server.

In another exemplary embodiment, when a smart device (non-primary) is undocked from the conferencing apparatus and is required to continue on the ongoing conference, the conferencing apparatus and the smart device's native application can execute safe-undocking and call-carry on. In another example, when a primary smart device (smart device hosting the conference) is undocked, the conferencing apparatus can follow the technique as previously illustrated. However, when two or more primary smart devices are undocked from the conferencing apparatus, the call continues as a traditional two party call such as FaceTime™ or Skype™. The exemplary operation of using the conferencing apparatus terminates when the video conferencing ends and the smart devices are removed from the conferencing apparatus.

FIG. 1 illustrates an exemplary representation of proposed conference apparatus 100 in accordance with an embodiment of the present disclosure. As illustrated in FIG. 1, a user A with TabletPC docked on the conference base (outer docking base 104 or inner docking base 108) can be on a point-to-point multimedia call with a User X over a Wi-Fi network. Similarly, a User B with TabletPC docked on conference base can be on a point-to-point multimedia call with a user Y over the Wi-Fi network. Similarly, a User C with TabletPC docked on conference base can be on a point-to-point multimedia call with a user Z over the Wi-Fi network. In an embodiment, processor housed within the conference base of the conferencing apparatus 100 can provide necessary functionality to coordinate with docked-in smart devices 106-1/106-2 to source video or image data from desirable device's camera and feed to FaceTime™ call sessions on the other smart devices docked-in on the conference base. The processor, using the microphone(s), can determine the direction of the strongest audio surrounding the conference base and can determine the camera of the device that is directionally aligned to the audio source. The processor can then interact with the mobile application on the smart device to source the camera feed. Additionally, the processor can interact with the mobile application on the other smart devices that are docked-in on the conference base to redirect the feed to them in order for them to transmit video/image data for the FaceTime™-type multimedia point-to-point call sessions. In this example, individual FaceTime™-type calls can proceed over the Wi-Fi network. Alternatively, upon docking-in on the conference base, the call can be redirected/port-forwarded over to the wired network through the smart devices docking interface and the conference base's Gigabit Ethernet networking interface. This example can be implemented with one two or all three (as shown above) on individual FaceTime™ calls. Any other architecture to connect/operate the calls using the proposed video conferencing apparatus is completely within the scope of the present disclosure.

Additionally in this example, the conferencing apparatus can enable switching among docked smart devices based on the proximity (physical docking slot-id) context-aware automation of steps related to multimedia conference call management. In this example, docking of additional smart devices on the docking bases automatically, through software and/or hardware control, can allow camera and screen of the smart device to be utilized in the conference session. Additionally, the conferencing apparatus can supports additional platform APIs to enable phones to add these and other similar functions. By way of example only, smart device's platform API can be expanded, if not already available, to support above mentioned use cases. Based on the above illustrated conferencing apparatus and the techniques, technology disclosed herein provides advantages of working as an accessory for video conferencing without tightly integrating it with any particular Video chat Mobile Applications (e.g. Facetime™, Skype™, Google™ Hangout™).

A method of making a conferencing apparatus can include providing a base with a first surface, and communicably coupling an outer rotatable docking base to the first surface of the base. Next, an inner rotatable docking base can be received at a base receiving interface of the outer docking base. One or more processors can then be coupled within the outer rotatable docking base and the inner rotatable docking base. Additionally, one or more speakers and one or more microphone are disposed on the base of the conferencing apparatus. As mentioned above, the construction can be further simplified by only including a common base (no outer/inner base) having one or more docking slots to accept one or more smart devices.

Further, technology of the present disclosure requires a protocol handshake between the conferencing apparatus and docked smart devices in order for the smart devices to source multimedia streams to the rotatable docking bases (outer docking base and/or the inner docking base). The docking base can coordinate sourcing with docked smart devices and a conferencing server. Pairing and/or grouping of smart devices and their cameras can be determined by rotatable docking base depending on docking slot positions being occupied, their orientation with respect to each other, and resulting stream that can be generated, which may be either a 3 dimensional view or the augmented virtual reality 3 dimensional view. By way of example only, smart device platform APIs can be used to implement and facilitate the construction of the stereoscopic 3 dimensional view and the augmented virtual reality 3 dimensional view, although the 3 dimensional view or the augmented virtual reality 3 dimensional can be constructed using other techniques. This also includes the support of simultaneously sourcing of front and back cameras of the same smart device when instructed by the rotatable docking base of the conferencing apparatus. The rotatable conferencing base, using algorithms determines the stream pairing and/or grouping and sources the streams to the conferencing server. The conferencing server processes the streams using the information provided by the rotatable conferencing base and generates streams for stereoscopic 3 dimensional views and/or the augmented virtual reality 3 dimensional view.

FIGS. 1-31 illustrate multiple types of modular conference base configurations that enable a variety of multimedia conferencing use-cases that enhance user experience of conventional point-to-point video calls including, but not limited to, Apple™ FaceTime™, or Google™ Hangout™ or Skype™ and others, by way of example only. The enhancements range from multi-party FaceTime™ to HD 3D FaceTime™ to Augmented Reality HD 3D FaceTime™. The enhancements can be realized depending on the number of smart devices (smart-phone or tablet PC) docked on the modular conference base at each location of the multimedia conference session.

In another example, conferencing apparatus of the present disclosure can obtain multiple images from multiple cameras of one or more smart devices at a location of the conference call. Furthermore, proposed conferencing apparatus can combine and/or stitch the obtained image in order to create a panoramic view and allow for panning of the room by a remote viewer, although the conferencing apparatus can send the obtained images to a conferencing server to combine and/or stitch the images. Additionally, based on the stitched and/or combined image, conferencing apparatus and/or conference server of the present disclosure can create a virtual reality image. Furthermore, conferencing apparatus or the conference server can generate a high definition image by combining the obtained one or more images from the multiple cameras.

Figure 5:
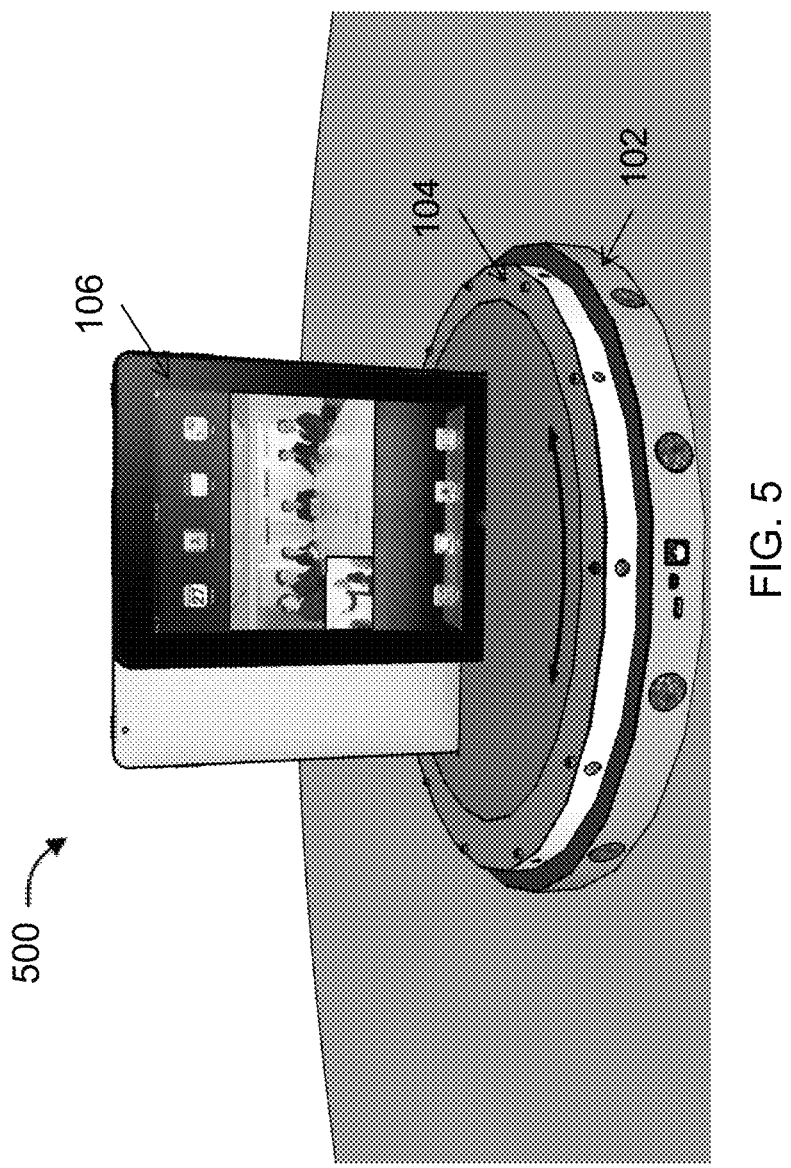
FIG. 5 illustrates another exemplary representation of proposed conference apparatus showing two tablets being configured in accordance with an embodiment of the present disclosure.
Figure 6:
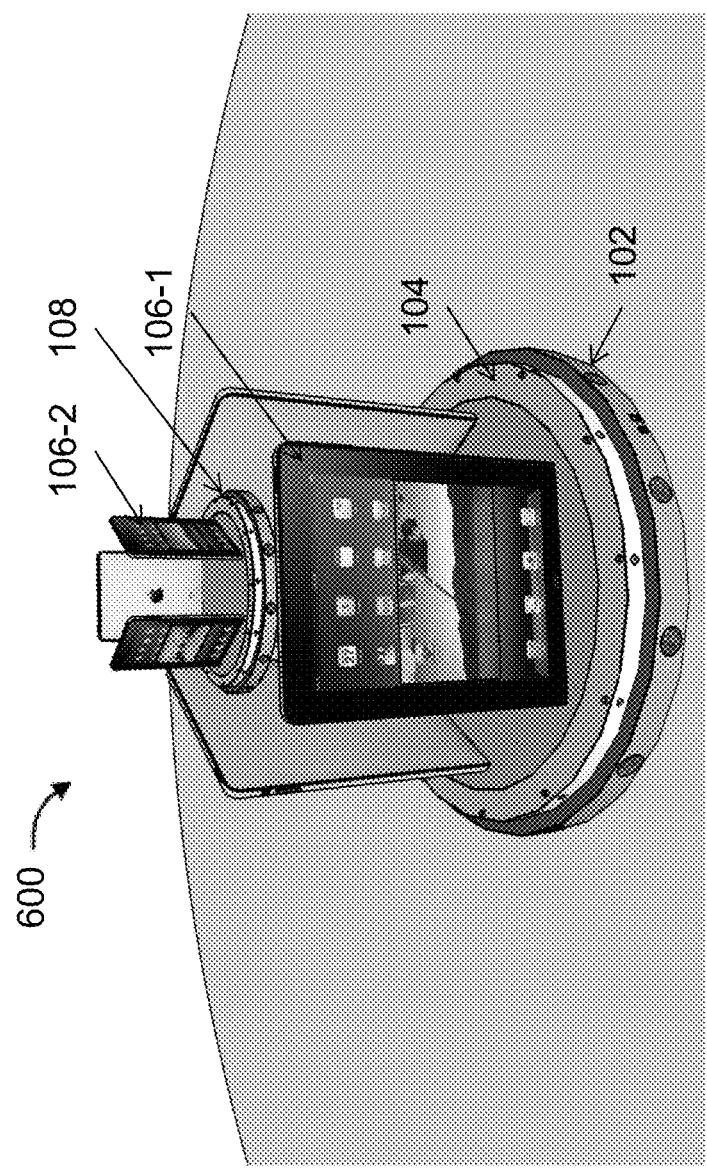
FIG. 6 illustrates another exemplary representation of proposed conference apparatus having smart devices configured in outer as well as inner rotatable bases in accordance with an embodiment of the present disclosure.

By way of example only, FIG. 5 illustrates a rotatable docking base in which two smart devices docked back-to-back against each other are configured to allow two cameras pointing in each direction, thus allowing capturing two video streams for 3D video stream reconstruction. In another example, FIG. 6 illustrates modular docking base having a plurality of smart devices, ranging from one to any number of smart devices (six shown in FIG. 6 implementation) in any combination of smartphones and tablet PCs or other smart devices. In this example, when more than 3 smart devices are necessary, the smart phone devices can be docked on an elevated modular telescopic extension as illustrated in FIG. 6. Depending on the number of smart devices docked on any given conference base, different variations of user experience can be expanded to the conference participants.

In this example, having at least two smart devices docked on a rotatable docking base enables base hardware and software to offer richer user experience. By way of example only, the rotatable docking base of FIG. 6 can identify the two iPad devices being docked in a back to back orientation with first pair of two device's cameras pointing in one direction, and second pair of the same two device's cameras pointing in the direction 180 degree opposite from the first pair of cameras. Additionally in this example, the rotatable docking base interacts with the docked smart devices to retrieve, in real-time, the video streams from their respective cameras and interacts with conference server to feed, in real-time, the two pairs of the video streams. The conference server processes each pair of video streams using 3D conversion algorithms, which are known to a person having ordinary skill in the art and thus will not be described herein. The conference server can then feed the 3D processed video streams from each source rotatable docking base to destination rotatable docking, which has previously made its display capabilities and intents known to the conference server.

Alternatively, in another embodiment, rotatable conference base illustrated in FIG. 6 is participating in a conference session with combination of two or more smart devices being docked-on, enabling a different type of conference experience for participants. The modular rotatable docking base hardware/software recognizes slot locations and directions that each device point to, wherein the base uses all this information to facilitate the conference server to construct an augmented reality 3D video stream. As illustrated above, the base interacts with the docked smart devices to retrieve, in real-time, video streams from their respective cameras and interacts with the conference server to feed, in real-time, the set of the video streams along with their respective locations and directions information. By way of example only, the conference server, in real-time, processes video streams to stitch them together to generate an augmented reality 3 dimensional view of the respective conference location. The conference server can then feed, in real-time, the 3D video streams from each such source conference base to destination conference base, which has previously made its display capabilities and intents known to the conference server. The conference participant at the destination rotatable docking base can perform pan, zoom on the augmented reality 3D video stream and remotely (virtually) go around the conference location as if the participant is walking around the conference table around the sited conference participants.

Additionally, augmented reality 3D video streams from each conference location can be further combined so as to create an experience of a co-located aggregated conference room type augmented reality 3D video. By way of example only, conference participant at any conference base location can perform pan, zoom on the augmented reality 3D video stream of the co-located super conference room and remotely (virtually) go around the co-located aggregated conference room as if the participant is walking around the conference table around the sited conference participants.

Figure 7:
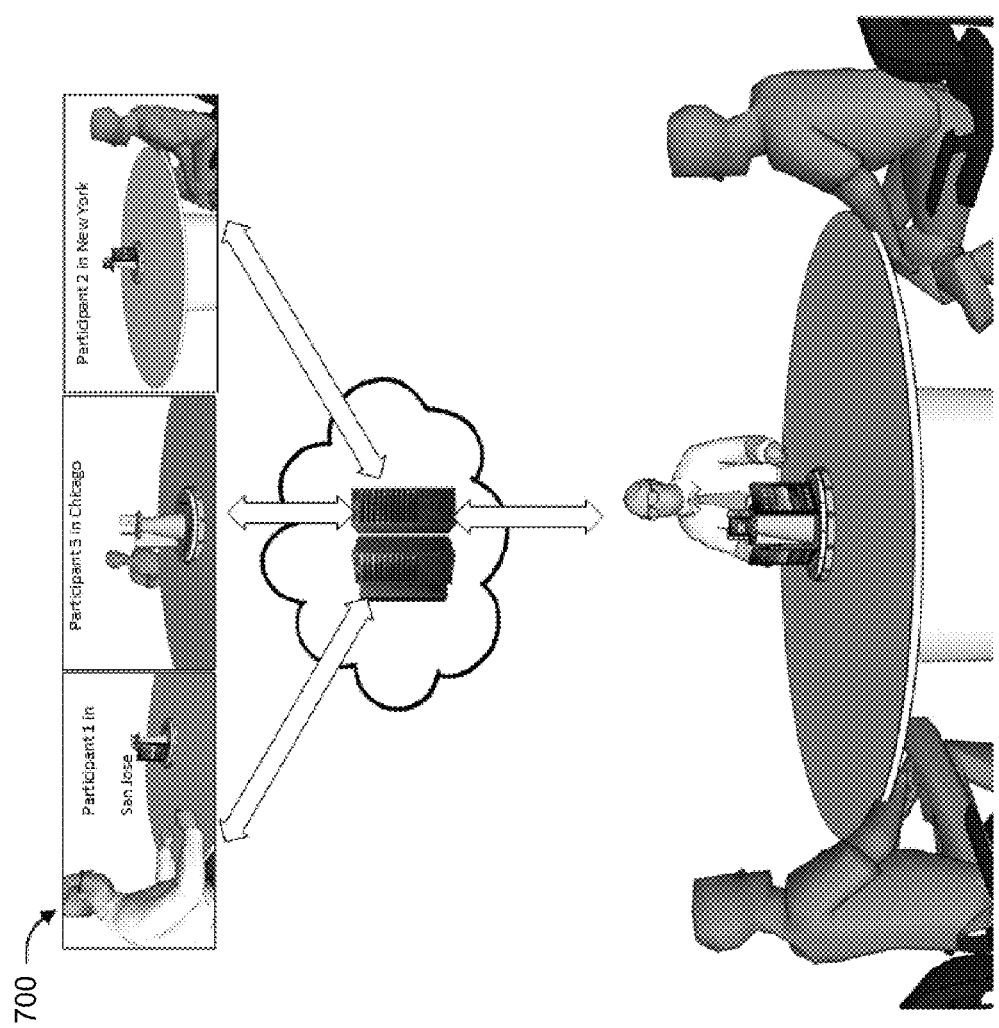
FIG. 7 illustrates another exemplary representation of proposed conference apparatus showing rendering of video conference in an augmented reality framework in accordance with an embodiment of the present disclosure.
Figure 8:
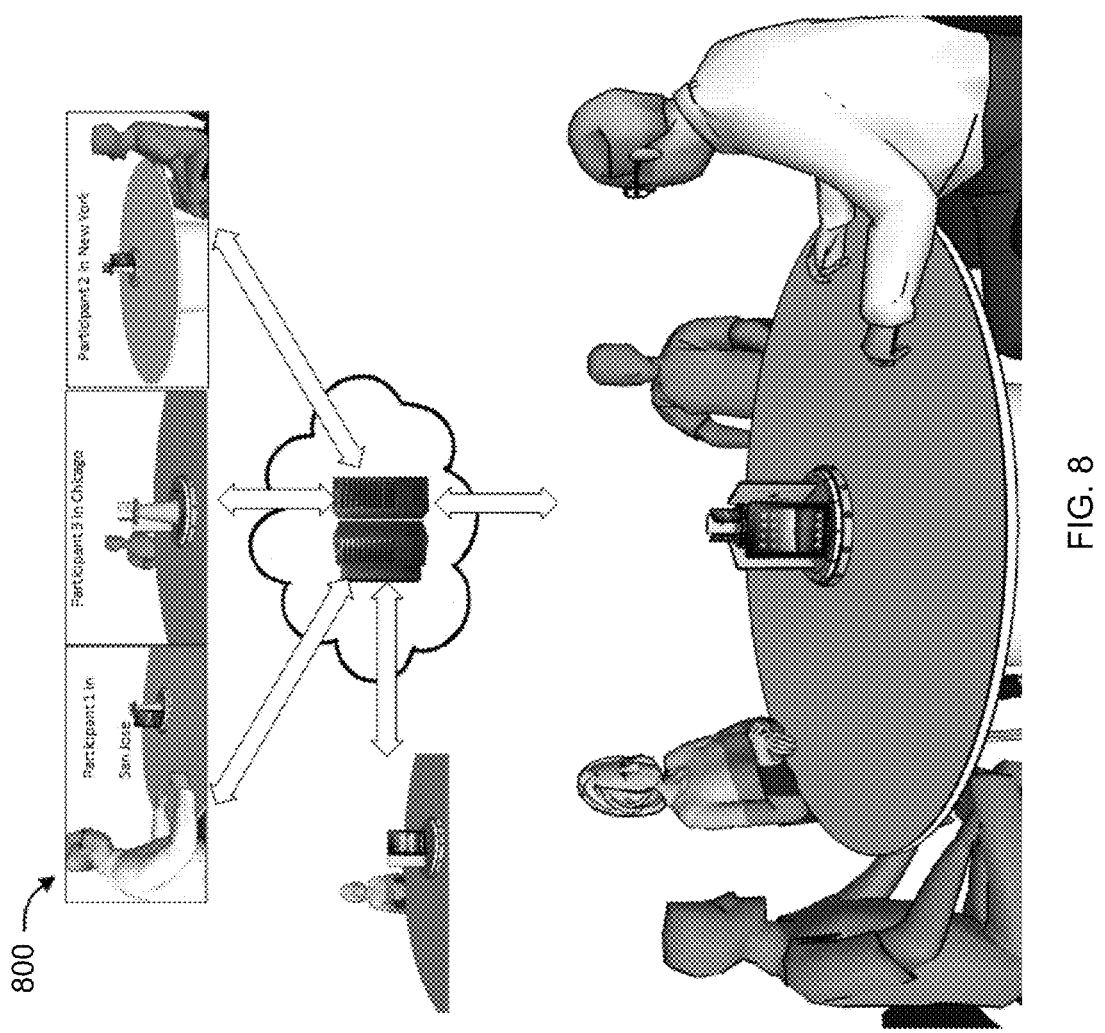
FIG. 8 illustrates another exemplary representation of proposed conference apparatus showing rendering of video conference in an augmented reality framework in accordance with an embodiment of the present disclosure.
Figure 9:
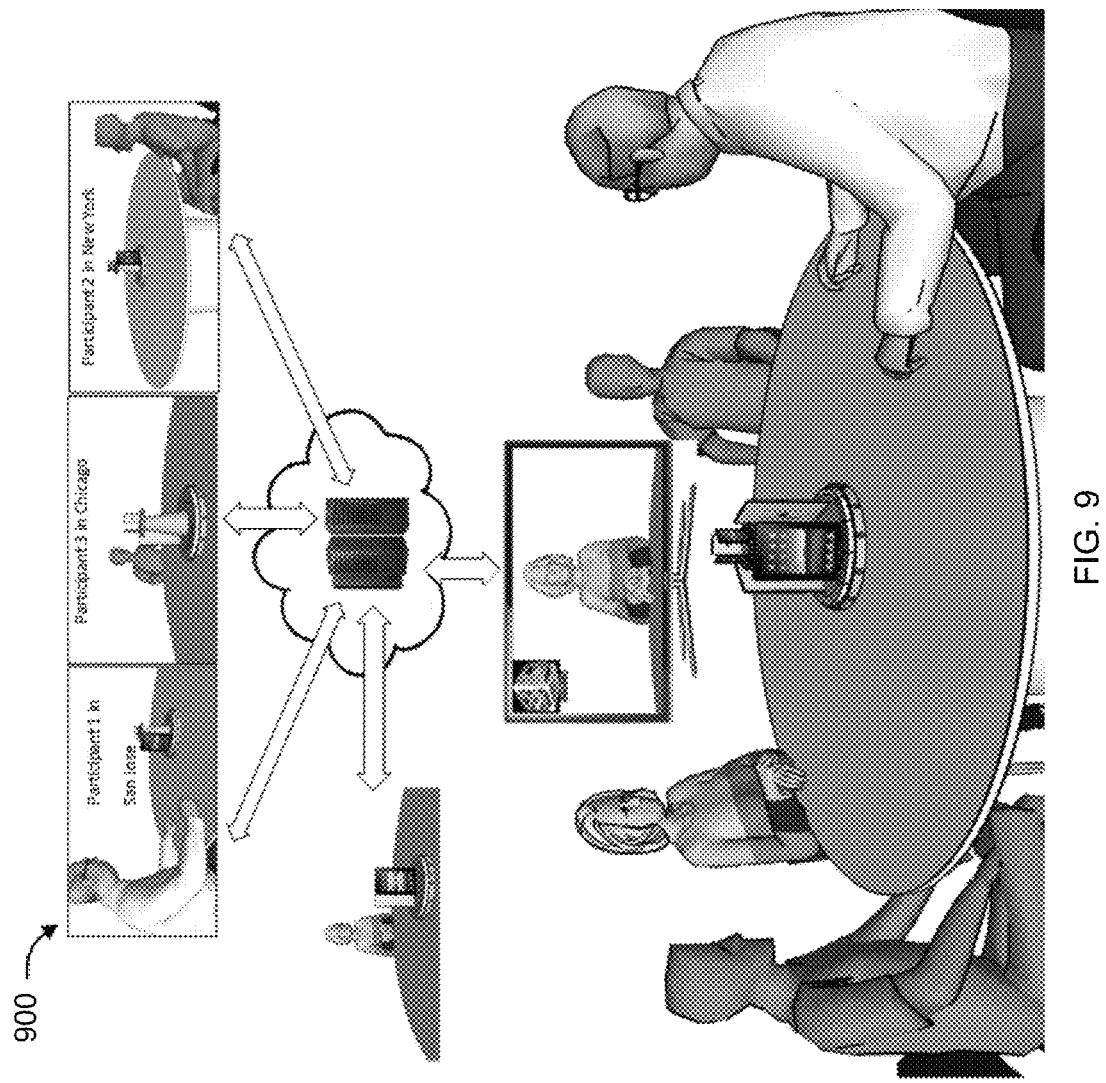
FIG. 9 illustrates another exemplary representation of proposed conference apparatus showing rendering of video conference in an augmented reality framework in accordance with an embodiment of the present disclosure.

FIGS. 7-9 illustrate an augmented reality 3D video stream of the co-located aggregated conference room. As shown in FIG. 7, the three participants are located in three different locations in front of their respective rotatable docking base, each with say at least two smart devices docked-in. As previously illustrated, hardware and software equipped on the rotatable docking bases transmit video streams along with additional facilitating information to a 3D and virtualization conference server, although the information could be sent to other types or amounts of devices. Based on the type and extent of information being provided by the rotatable conferencing base, the conference server can process it to construct an augmented reality 3D video stream of the co-located super conference room. By way of example only, when sufficient numbers of devices, e.g. three smartphones and three tablet PCs, are docked on the rotatable docking base, the conference server can also construct location specific augmented reality 3D video stream and transmit either one or both streams to the destination rotatable docking base location, which then routes appropriate streams to capable display devices that are connected to its HDMI or Intranet Gigabit Ethernet or other high speed communication ports. Additionally, in this example, augmented virtual reality 3D conference server may be provisioned with the database about the conference rooms. By way of example only, conference room database can include a circulating video camera of the conference room around the table, although the database can include other types or amounts of information. If the location information from the rotatable docking base matches with conference room video in the database, the conference server may augment the video from the database with live conference session, enabling navigation by a virtual camera as being operated by a conference participant.

In another aspect, FIGS. 8-9 illustrate another combination of augmented reality 3D video and a 3D video conferencing using rotatable docking base illustrated in FIGS. 8-9. As shown in FIGS. 8-9, a fourth participant from Austin is sitting in front of a rotatable docking base of FIG. 8 with two smart devices being docked into their respective slots. In this example, the figure shows two iPads being docked but the two devices can both be iPhones as well, although other types or numbers of devices can be docked. In this example, for natural 3D processing, distance and level of two co-directional cameras of the docked smart devices resemble human inter-ocular distance, although the distance and the level of two co-directional cameras can be different from the human inter-ocular distance. By way of example only, inter-ocular distance between two iPad devices can be higher than that if the two iPhone devices are being docked on the rotatable docking base. Additionally, FIGS. 8-9 illustrate an augmented reality three-dimensional telepresence with three dimensional presences on 3D TV display using the techniques illustrated above.

Figure 28:
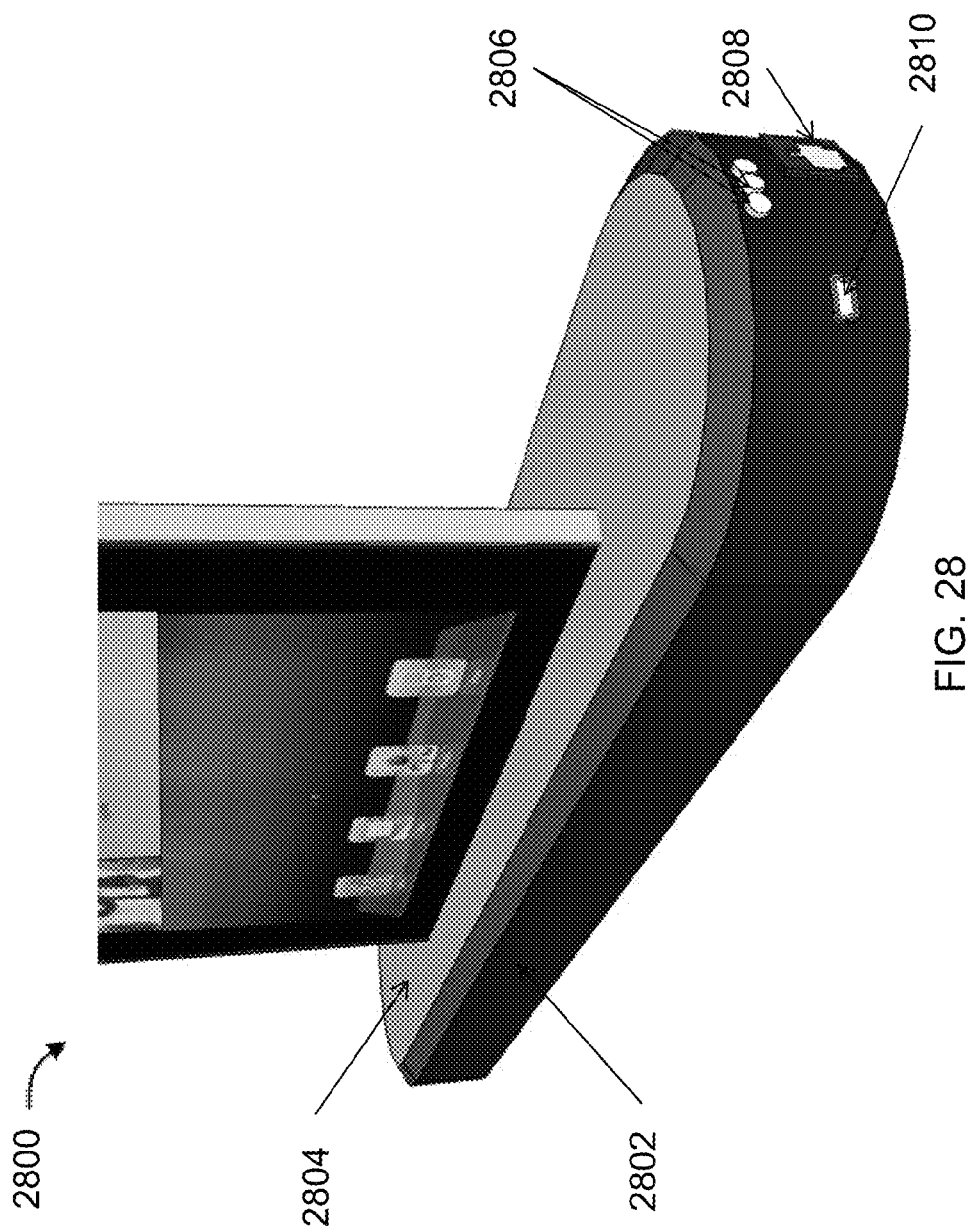
FIG. 28 illustrates exemplary connectors used in the proposed conference apparatus in accordance with an embodiment of the present disclosure.

In another example, conferencing apparatus of the present disclosure can be in the shape of an elongated bar with rounded edges as illustrated in FIGS. 28-29, although the conferencing apparatus can be of other shapes or size. The conferencing apparatus illustrated in FIGS. 28-29 includes one or more docking bases, one or more processors, a HDMI port, a power outlet 2902, a Bluetooth Low Energy (Bluethooth LE) and corresponding light indicator, an emitter diode 2806, and a detector diode 2806, although the conferencing apparatus can include other types or amounts of different components, sensors and detectors such as temperature, motion, speaker and/or microphone among others. In this example, the conferencing apparatus can include a base layer 2802, a surface layer 2804 parallel to the base layer and an intermediate layer between the base layer and the surface layer. The surface layer 2804 is in contact with the ground or table as illustrated in FIGS. 28-29, and the base layer 2802 is at an elevation from the surface layer 2804. The base layer 2802 can include the one or more docking bases assisting with docking of smart devices although the base layer can include other types or amounts of components. As illustrated in FIGS. 28-29, the intermediate layer can include an HDMI port 2802, a power outlet 2902, a Bluetooth light indicator, an emitter diode 2806, and a detector diode 2806, although the HDMI port 2802, the power outlet 2902, the Bluetooth Low Energy (Bluethooth LE) and corresponding light indicator, the emitter diode and the detector diode can be disposed on other layers of the conferencing apparatus.

In another aspect, one or more processors within the conferencing apparatus can be housed between the surface layer and the base layer, although the one or more processors can be housed at other locations. The one or more processors can be configured to execute programmable instructions or any other configured code embodied in a memory configured within the apparatus, wherein the processor(s) can be configured to manage and control the operation of the docked smart devices, the Bluetooth light indicator, the HDMI port 2802, the emitter diode and the detector diode, among other types and numbers of systems, devices, components, and/or other elements that can also be managed and controlled by the one or more processors.

In another exemplary embodiment, instead of using one or more processors, a single board computer (SBC) logic can be implemented to control the docked smart devices, the Bluetooth light indicator, the HDMI port 2902, the emitter diode and the detector diode 2806, among other components of the video conferencing apparatus. In one example, the single board computer logic can be housed between the surface layer and the base layer, although the SBC logic can be housed at other locations within the conferencing apparatus.

Further, as illustrated in FIGS. 28-29, the Bluetooth light indicator, the emitter diode and the detector diode can be disposed on rounded edges of the conferencing apparatus, although the Bluetooth light indicator, the emitter diode and the detector diode can be disposed at other locations. In this example, the emitter diode can be used to transmit signals such as light and the detector diode is used to receive the emitted signals from the emitter diode, although the emitter diode and the detector diode can be configured to perform other types or amounts of functions. For purpose of further illustration with reference to FIG. 28-29, the order of the Bluetooth light indicator 2904, the emitter diode 2806 and the detector diode 2806 on the conferencing apparatus is from left to right is the emitter diode, the Bluetooth light indicator 2904 and then the detector diode 2806, although the order of the emitter diode and the detector diode could be switched as illustrated in FIG. 33. In this example, the Bluetooth light indicator using the one or more processors, the emitter diode and the detector diode is used to measure distance between two conferencing apparatus.

An exemplary illustration of the use of the conferencing apparatus illustrated in FIGS. 32-33 will now be illustrated with reference to FIG. 31. As illustrated in FIG. 31, one or more participants dock their smart devices on the docking base of the conferencing apparatus, wherein processor housed within the apparatus provides necessary functionality to coordinate with the docked-in smart devices to source video or image data from the desirable device's camera and feed to FaceTime™ call sessions on the other smart devices docked-in on the conference base.

In an aspect, the processor, based on information received from the microphones, can determine the direction of strongest audio surrounding the conference base, and can determine the camera of the device that is directionally aligned to the audio source. Next, the processor can interact with the mobile application on the smart device to source the camera feed. Additionally, the processor can interact with the mobile application on the other smart devices that are docked-in on the conference base to redirect the feed to them in order for them to transmit video/image data for the FaceTime™-type multimedia point-to-point call sessions. In this example, individual FaceTime™-type calls can proceed over the Wi-Fi network. Alternatively, upon docking-in on the conference base, the call can be redirected/port-forwarded over to the wired network through the smart devices docking interface and the conference base's Gigabit Ethernet networking interface. This example can be implemented with one two or all three (as shown above) on individual FaceTime™ calls.

Additionally in this example, the conferencing apparatus can enable switching among docked smart devices based on the proximity (physical docking slot-id) context-aware automation of steps related to Multimedia Conference call management. In this example, docking of additional smart devices on the docking bases automatically, through software and hardware control, can allow the use of camera and screen of the smart device to be utilized in the conference session. Additionally, the proposed conferencing apparatus can support additional platform APIs to enable phones to add these and other similar functions. By way of example only, smart device's platform API can be expanded, if not already available, to support the above use cases. Based on the above illustrated conferencing apparatus and the techniques, the technology disclosed herein provides advantages of working as an accessory for video conferencing without tightly integrating it with any particular Video chat Mobile Applications (e.g. Facetime™, Skype™, Google™ Hangout™).

Next, as illustrated in FIG. 29, a second conferencing apparatus can be placed next to the first conferencing apparatus. In this example, distance and alignment between the first conferencing apparatus and the second conferencing apparatus can be determined based on any or a combination of the emitter diode, the detector diode, the Bluetooth Low Energy (Bluetooth LE), and corresponding light indicator. By way of example only, when the second conferencing apparatus is placed next to the first conferencing apparatus, the emitter diode from the first conferencing apparatus emits a signal that is received by the detector diode. Similarly, the emitter diode of the second conferencing apparatus emits a signal that is received by the detector diode of the first conferencing apparatus, wherein when both the detector diodes receive the signals, the Bluetooth Low Energy (Bluetooth LE) and corresponding light indicator is turned on (blinking) by the processor within the conferencing apparatus to indicate that the conferencing apparatus is aligned and that it can now be used for conferencing. However, when the Bluetooth light indicator is turned on solid after placing both the conferencing apparatus next to each other within a preferred range, it can be configured to indicate that the distance between the two conferencing apparatus has been reached. Both the apparatuses can use this information to communicate with, and facilitate the server to determine how to synthesize video streams received from the front, back or both the cameras of the plurality of smart devices that are docked. As previously illustrated, distance between the first conferencing apparatus and the second conferencing apparatus should enable the detector diodes on each of the conferencing apparatus to be able to receive the signal sent from the emitter diodes. In this example, when the Bluetooth light indicator is turned on solid, the two conferencing apparatus using the image and/or video from the smart device and the server, stiches the images and provides a panoramic view of the conference hall to other conference participants at other locations. Alternatively, the conferencing apparatus can be used and projected on to a screen as illustrated in FIG. 29. Alternatively, the panoramic view of the conference hall can also be projected on to a screen as illustrated in FIG. 29. Additionally, by placing the two conferencing apparatus next to each other at the correct distance (so that the Bluetooth LE light indicator is turned on solid), the technology disclosed herein also provides a picture-in-picture functionality so that the conferencing participant talking can be shown in a small aperture and the panoramic view of the conference location can be displayed as a bigger aperture or vice-versa.

Figure 30A:
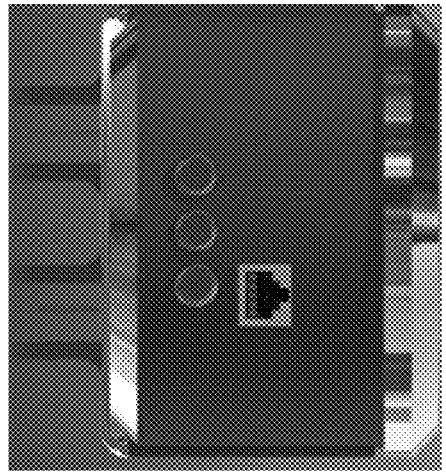
FIGS. 30A to 30E illustrate a modular constructional representation of the proposed conference apparatus in accordance with an embodiment of the present disclosure.
Figure 30B:
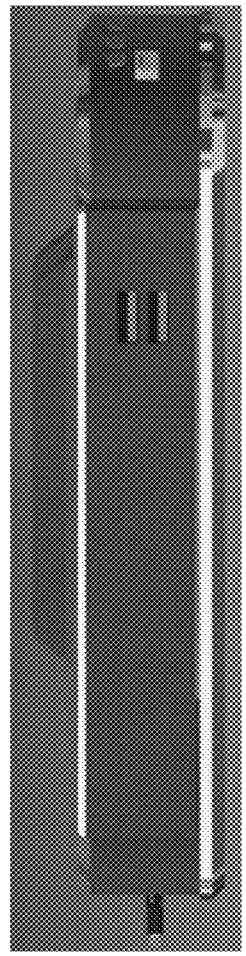
Figure 30C:
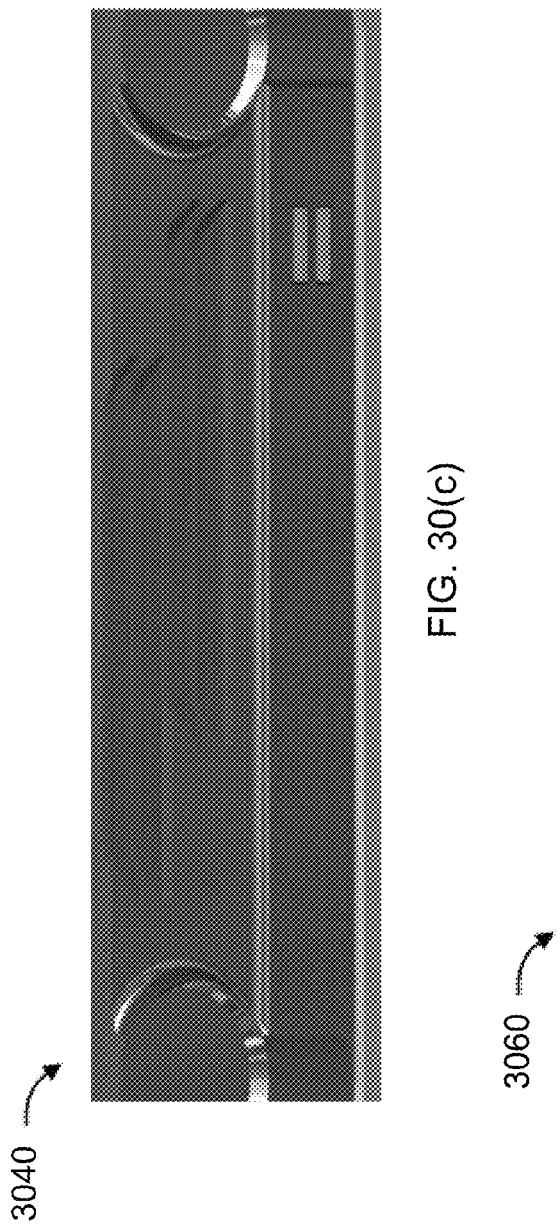
Figure 30D:
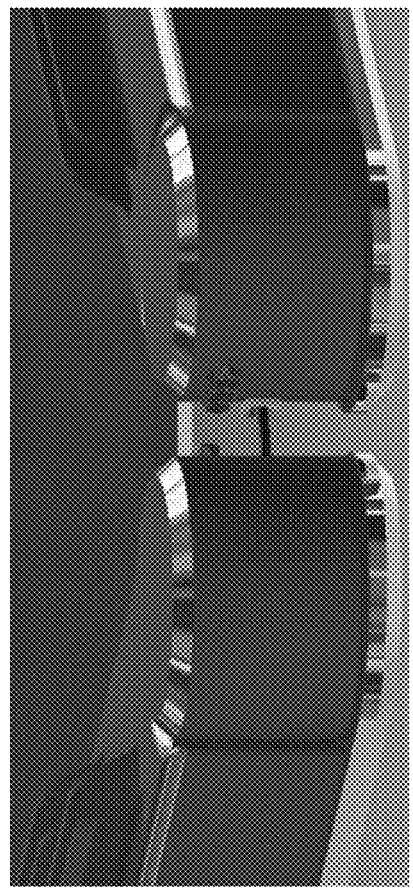
Figure 30E:
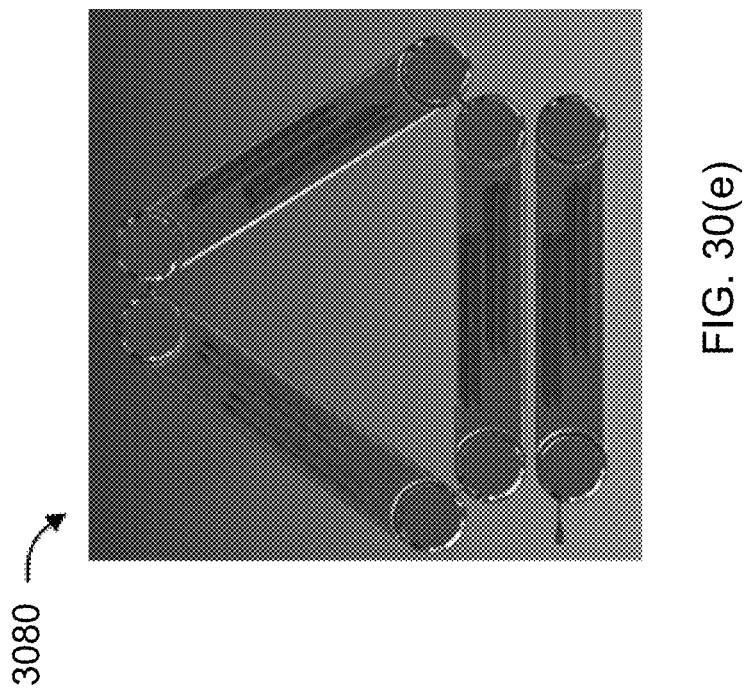

FIGS. 30(a) to 30(e) illustrate a modular constructional representation of the proposed conference apparatus in accordance with an embodiment of the present disclosure. As shown, FIG. 30(a) represents the rear view of the proposed conference apparatus with multiple ports/connections for Ethernet, audio/video elements/components, among other allied hardware/firmware elements. FIG. 30(b) on the other hand shows the side view, and FIG. 30(c) shows the perspective view showing the self-contained modular design of the proposed conference apparatus. FIG. 30(d), on the other hand, shows a plurality of modular components having built-in slots for enabling docking of smart devices, wherein, being modular, the components can be segregated and arranged in any desired shape. The modules can also be connected with each other to form a daisy chain like structure as shown in FIG. 30(e).

Figure 31A:
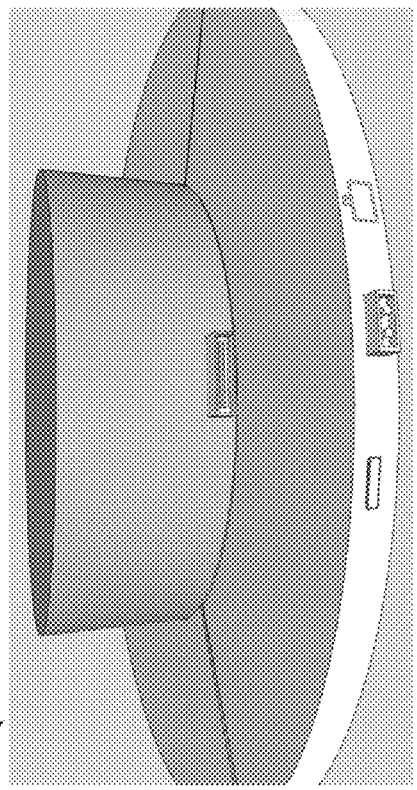
Figure 31B:
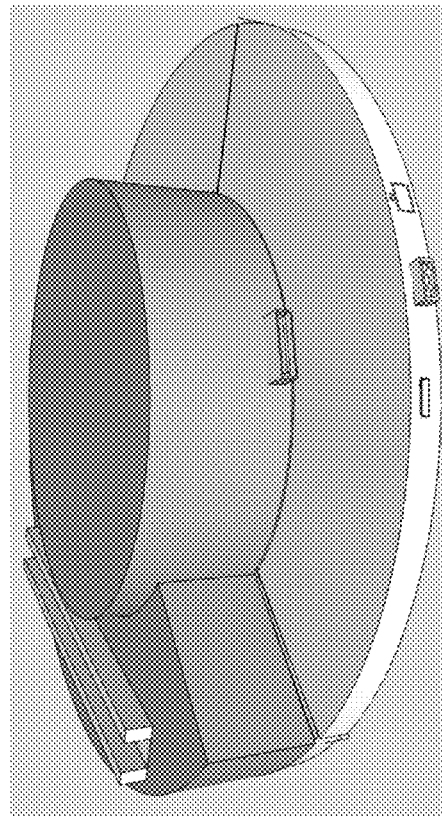
Figure 31E:
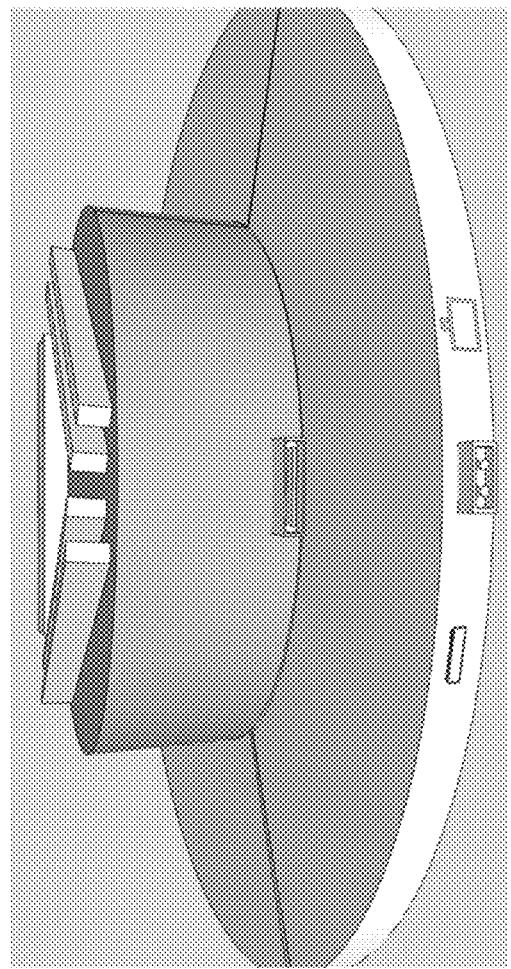

FIGS. 31(a) to 31(e) illustrate another modular constructional representation of the proposed conference apparatus in accordance with an embodiment of the present disclosure. As shown, the apparatus shows an elevated inner docking base, alongside which, as shown in FIGS. 31(b)-31(e), three detachable modules can be configured as and when required, wherein each module can have one or more docking slots. FIG. 31(e), on the other hand, shows docking slots configured on the inner docking base and also shows other ports/connections configured on the base of the conferencing apparatus of the present disclosure.

According to another embodiment, conference apparatus of the present disclosure is universal and can accommodate any smart device by means of various docking slots configured on the base of the apparatus. A user can therefore, by means of a single base having one or more processors/components, keep changing the outer/inner docking bases to change the type/mode/style of smart device to enable the video conferencing session.

According to one embodiment, conference apparatus of the present disclosure can be configured as being modular, wherein the docking base (having outer and/or inner docking bases) can include one or more docking base modules configured on said base. In an aspect, the one or more docking base modules can be of different sizes and shapes, wherein each of the one or more docking base modules can include at least one docking slot to accommodate at least one smart device. According to another embodiment, the one or more docking base modules can be operatively coupled with each other to form a daisy chain, wherein the one or more docking base modules can be LEGO type docking modules.

According to another embodiment, conference apparatus of the present disclosure can be authenticated by means of an authentication server/server, where the apparatus can further enable authentication of the one or more smart devices connected thereto.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claim.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A conferencing apparatus comprising:
    an inner docking base; and
    an outer docking base concentrically positioned around and extended outward from the inner docking base and operatively coupled to said inner docking base, and wherein said the inner docking base and the outer docking base comprises a plurality of docking slots, wherein said plurality of docking slots are detachably coupled to one or more portable devices, and wherein the inner docking base and the outer docking base comprises one or more processors that are configured to execute programmed instructions stored in a memory to:
    receive one or more portable devices at one or more of the plurality of docking slots;
    authenticate the received one or more portable devices via an authentication server; and
    provide a video conferencing facility to the authenticated one or more portable devices, wherein the provided video conferencing facility can be a single video conferencing facility for all of the authenticated one or more portable devices or a unique video conferencing facility for each of the authenticated one or more portable devices, based on a physical docking slot identification number of the one or more of the plurality of docking slots at which the one or more portable devices were received.

2. The apparatus of claim 1, wherein said outer docking base is operatively coupled with one or more processors configured to execute programmed instructions stored in the memory to detect said one or more portable devices and enable coupled one or more portable devices to join said conferencing.

3. The apparatus of claim 2, wherein said one or more processors are configured to execute programmed instructions stored in the memory to measure signal strength coming from microphones or speakers of said apparatus or of said one or more portable devices, and further configured to detect the one or more microphone(s) associated with a strongest signal.

4. The apparatus of claim 1, wherein said outer docking base is rotatable.

5. The apparatus of claim 1, wherein said inner docking base is operatively coupled with one or more processors configured to execute programmed instructions to detect said one or more portable devices and enable said conferencing to take place between said coupled one or more portable devices at a remote location.

6. The apparatus of claim 5, wherein said one or more processors are configured to execute programmed instructions to rotate said outer docking base or said inner docking base based on strongest signal strength.

7. The apparatus of claim 1, wherein said inner docking base is configured to be extended to a telescopic level from the outer docking base that is higher than said one or more portable devices docked on said outer docking base.

8. The apparatus of claim 1, wherein one or more electrical contacts are configured between said inner docking base, and said outer docking base.

9. The apparatus of claim 1, wherein said inner docking base is oriented at an angle to said outer docking base.

10. The apparatus of claim 1, wherein said inner docking base is rotatable around said outer docking base.

11. The apparatus of claim 1, wherein said apparatus further comprises one or more microphones or one or more speakers, wherein during said conferencing, microphone or speakers said apparatus or said one or more portable devices are used.

12. The apparatus of claim 1, wherein one or more video output ports are configured in any or a combination of said inner docking base and said outer docking base, wherein one or more of a television or a projector is connected to the conferencing apparatus via said one or more video output ports.

13. The apparatus of claim 1, wherein said one or more portable devices comprise one or a combination of tablet PC, mobile phone, one or more sensors, or smart phones.

14. The apparatus of claim 1, wherein said apparatus is modular.

15. The apparatus of claim 1, wherein said inner docking base and said outer docking base comprises one or more docking base modules configured on said base.

16. The apparatus of claim 15, wherein said one or more docking base modules are of different sizes and shapes, and wherein each of said one or more docking base modules includes at least one docking slot to accommodate at least one smart device.

17. The apparatus of claim 15, wherein said one or more docking base modules are operatively coupled with each other to form a daisy chain.

18. The apparatus of claim 15, wherein said one or more docking base modules are LEGO type docking modules.

19. The apparatus of claim 1, wherein said apparatus is authenticated by an authentication server, and wherein said apparatus further configured to execute programmed instruction to enable authentication of said one or more portable devices.

20. The apparatus of claim 1 wherein the one or more processors in the inner docking base and the outer docking base are configured to execute programmed instructions stored in the memory to:
   receive patient vital sign monitoring data from one or more sensors coupled to the inner docking base and the outer docking base;
   secure the received patient vital sign monitoring data; and
   transmit the secured patient vital sign monitoring data to a healthcare provider device via a communication network.

* * * * *